US012570560B2

(12) United States Patent (10) Patent No.: US 12,570,560 B2
Matsui (45) Date of Patent: Mar. 10, 2026

(54) WATER TREATMENT METHOD AND WATER TREATMENT APPARATUS

(71) Applicant: Yokogawa Electric Corporation, Musashino (JP)

(72) Inventor: Yasuhiro Matsui, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 393 days.

(21) Appl. No.: 18/032,248

(22) PCT Filed: Sep. 15, 2021

(86) PCT No.: PCT/JP2021/033891
§ 371 (c)(1),
(2) Date: Apr. 17, 2023

(87) PCT Pub. No.: WO2022/085343
PCT Pub. Date: Apr. 28, 2022

(65) Prior Publication Data
US 2023/0399249 A1 Dec. 14, 2023

(30) Foreign Application Priority Data
Oct. 20, 2020 (JP) ................................. 2020-175783

(51) Int. Cl.
*B01D 61/02* (2006.01)
*B01D 61/42* (2006.01)
(Continued)

(52) U.S. Cl.
CPC ................ *C02F 9/00* (2013.01); *B01D 61/58* (2013.01); *B01D 61/026* (2022.08);
(Continued)

(58) Field of Classification Search
CPC .......... C02F 9/00; C02F 1/441; C02F 1/4618; C02F 1/4674; C02F 1/4693; C02F 1/66;
(Continued)

(56) References Cited

U.S. PATENT DOCUMENTS 4,676,908 A * 6/1987 Ciepiela .................... C02F 9/00
210/667
5,578,181 A 11/1996 Hirose et al.
(Continued)

FOREIGN PATENT DOCUMENTS

CN 102583862 A * 7/2012 ............... C01D 3/04
CN 105016541 A * 11/2015
(Continued)

OTHER PUBLICATIONS

English translation of Publication CN102583862A, Jul. 18, 2012. (Year: 2012).*
(Continued)

*Primary Examiner* — Joseph W Drodge
(74) *Attorney, Agent, or Firm* — WHDA, LLP

(57) ABSTRACT

A water treatment method includes a microbubble generating step (S101) of generating microbubbles in water to be treated containing at least calcium ions and producing water to be treated containing microbubbles, a water softening step (S102) of crystallizing calcium ions contained in the water to be treated containing the microbubbles as calcium carbonate and removing the calcium carbonate, and a reverse osmosis membrane treatment step (S103) of separating the water to be treated, from which the calcium carbonate has been removed, into reverse osmosis membrane treated water and reverse osmosis membrane concentrated water using a reverse osmosis membrane.

14 Claims, 9 Drawing Sheets

(51) Int. Cl.

| | | |
|---|---|---|
| *B01D 61/58* | (2006.01) | |
| *C02F 1/44* | (2023.01) | |
| *C02F 1/46* | (2023.01) | |
| *C02F 1/66* | (2023.01) | |
| *C02F 5/02* | (2023.01) | |
| *C02F 9/00* | (2023.01) | |
| C02F 1/461 | (2023.01) | |
| C02F 1/467 | (2023.01) | |
| C02F 1/469 | (2023.01) | |
| C02F 1/52 | (2023.01) | |
| C02F 101/10 | (2006.01) | |
| C02F 103/00 | (2006.01) | |

(52) U.S. Cl.
CPC ............ *B01D 61/422* (2013.01); *C02F 1/441* (2013.01); *C02F 1/4618* (2013.01); *C02F 2001/46185* (2013.01); *C02F 2001/4619* (2013.01); *C02F 1/4674* (2013.01); *C02F 1/4693* (2013.01); *C02F 2001/5218* (2013.01); *C02F 1/66* (2013.01); *C02F 5/02* (2013.01); *C02F 2101/10* (2013.01); *C02F 2103/007* (2013.01); *C02F 2301/08* (2013.01); *C02F 2303/04* (2013.01); *C02F 2303/14* (2013.01)

(58) Field of Classification Search
CPC .............. C02F 5/02; C02F 2001/46185; C02F 2001/4619; C02F 2001/5218; C02F 2101/10; C02F 2103/007; C02F 2301/08; C02F 2303/04; C02F 2303/14; C02F 1/20; C02F 1/24; C02F 1/42; C02F 1/442; C02F 1/444; C02F 2103/08; C02F 2209/06; C02F 1/52; C02F 1/5209; C02F 2001/5118; B01D 61/58; B01D 61/026; B01D 61/422; B01D 65/02; B01D 2311/06; B01D 2311/18; B01D 2311/2665; B01D 2311/268; B01D 2311/2684; B01D 61/04; B01D 2311/04; B01D 61/025; B01D 9/00; B01D 2009/0086; B01D 21/01; B01D 21/08; B01D 61/02; B01D 2311/2642; B01D 2311/2643
See application file for complete search history.

(56) References Cited

U.S. PATENT DOCUMENTS

| | | | | |
|---|---|---|---|---|
| 2013/0161262 A1* | 6/2013 | Henley | ...................... | C02F 9/00 |
| | | | | 210/695 |
| 2015/0060286 A1* | 3/2015 | Govindan | ................. | C02F 5/10 |
| | | | | 204/666 |
| 2016/0185619 A1 | 6/2016 | Ukai et al. | | |
| 2017/0036923 A1* | 2/2017 | Cioanta | ............... | B01D 61/025 |
| 2021/0122654 A1 | 4/2021 | Takehisa et al. | | |

FOREIGN PATENT DOCUMENTS

| | | | | | |
|---|---|---|---|---|---|
| JP | 58-143881 | A | 8/1983 | | |
| JP | 59-112890 | A | 6/1984 | | |
| JP | 8-1168 | A | 1/1996 | | |
| JP | 8-182988 | A | 7/1996 | | |
| JP | 2006-305555 | A | 11/2006 | | |
| JP | 2014-14738 | A | 1/2014 | | |
| JP | 2018-35024 | A | 3/2018 | | |
| JP | 2020-32322 | A | 3/2020 | | |
| WO | WO-2013003012 A1 | * | 1/2013 | ............ | B03D 1/247 |
| WO | 2015/001678 A1 | | 1/2015 | | |

OTHER PUBLICATIONS

English translation of Publication CN105016541A, Nov. 4, 2015. (Year: 2015).*

International Search Report dated Nov. 9, 2021, issued in counterpart International Application No. PCT/JP2021/033891. (3 pages).

Office Action dated Apr. 8, 2024, issued in counterpart AU Application No. 2021365682. (3 pages).

\* cited by examiner

100

WATER TO BE TREATED

MICROBUBBLE GENERATING APPARATUS — 101

CRYSTALLIZATION APPARATUS — 102

REVERSE OSMOSIS MEMBRANE TREATMENT APPARATUS — 103

200

WATER TO BE TREATED

300

WATER TO BE TREATED

FIG. 14

WATER TREATMENT METHOD AND WATER TREATMENT APPARATUS

TECHNICAL FIELD

The present invention relates to a water treatment method and a water treatment apparatus.

BACKGROUND ART

In a water treatment process, in order to treat water to be treated, addition of various chemicals is essential. For example, a crystallization apparatus used for water softening needs to use a chemical (alkaline aqueous solution or the like) for a reaction of crystallization.

In addition, depending on an apparatus, it is necessary to periodically clean the apparatus chemically and physically, and even at this time, it is also necessary to use various chemicals. For example, in treatment using a chelate resin or an ion exchange resin, the chelate resin or the ion exchange resin needs to be periodically cleaned with chemical to recover performance.

Meanwhile, the various chemicals used in the above-mentioned water treatment processes need to be transported from outside and stored, and thus, an economic burden is increased.

On the other hand, for example. Patent Document 1 discloses an organic waste water treatment method including performing first water softening treatment, suspended solid removing treatment (SS removing treatment), and salts removing treatment with respect to organic waste water containing salts and organic matter, performing the water softening treatment with respect to the obtained salts-concentrated water again, and electrolyzing the obtained second softening treated water to generate a sodium hypochlorite solution.

In addition, Patent Document 2 discloses a treatment method of drainage containing neutral salts of monovalent ions, which includes supplying drainage to be treated into a diluted liquid chamber of a preliminary electrodialysis tank, and supplying a concentrated liquid containing salt generated by neutralizing ions passing through an ion exchange membrane in the preliminary electrodialysis tank into an electrodialysis tank using three chambers including an anode chamber, a center chamber, and a cathode chamber as a unit, in which a cation exchange membrane and an anion exchange membrane are used as a barrier membrane, and decomposing the liquid into the acid and base that compose the salt and collecting them.

In addition, Patent Document 3 discloses a drainage treatment apparatus and a drainage treatment method using the drainage treatment apparatus, which are capable of reducing running costs by increasing an oxygen concentration of treated water and activating aerobic microorganisms using a micro-nano-bubble generating apparatus.

CITATION LIST

Patent Document

[Patent Document 1]
Japanese Unexamined Patent Application Publication No. 2014-14738
[Patent Document 2]
Japanese Unexamined Patent Application Publication No. H08-01168

[Patent Document 3]
Japanese Unexamined Patent Application Publication No. 2006305555

SUMMARY OF INVENTION

Technical Problem

Incidentally, in a water treatment method, if the amount of various chemicals used in the water treatment process can be reduced, since the amount of chemicals to be transported from the outside and stored is reduced, an economic burden can be greatly reduced.

In consideration of the above-mentioned circumstances, the present invention is directed to providing a water treatment method and a water treatment apparatus that are capable of greatly reducing an economic burden.

Solution to Problem

In order to solve the above-mentioned problems, the present invention employs the following configuration.

That is, a first aspect of the present invention is a water treatment method that may include; a microbubble generating step of generating microbubbles in water to be treated containing at least calcium ions and producing water to be treated containing microbubbles; a water softening step of crystallizing calcium ions contained in the water to be treated containing the microbubbles as calcium carbonate and removing the calcium carbonate; and a reverse osmosis membrane treatment step of separating the water to be treated, from which the calcium carbonate has been removed, into reverse osmosis membrane treated water and reverse osmosis membrane concentrated water using a reverse osmosis membrane.

The water treatment method according to the first aspect of the present invention may further include: a pH adjusting step of adjusting a pH of the water to be treated containing the at least calcium ions to 8.3 or more and less than 10 before the water softening step.

The water treatment method according to the first aspect of the present invention may further include: a preliminary reverse osmosis membrane treatment step of separating the water to be treated containing the at least calcium ions into preliminary reverse osmosis membrane treated water and preliminary reverse osmosis membrane concentrated water using a preliminary reverse osmosis membrane before the microbubble generating step.

In the water treatment method according to the first aspect of the present invention, in the water softening step, a hydraulic retention time of the microbubbles may be 5 to 30 seconds.

The water treatment method according to the first aspect of the present invention may further include: an electrodialysis step of separating some of the water to be treated, from which the calcium carbonate is removed, into electrodialysis concentrated water and electrodialysis diluted water through electrodialysis treatment.

The water treatment method according to the first aspect of the present invention may further include: an electrolysis step of electrolyzing some of the electrodialysis concentrated water and obtaining an acidic aqueous solution and an alkaline aqueous solution.

In the water treatment method according to the first aspect of the present invention, the alkaline aqueous solution obtained in the electrolysis step may be used in the water softening step.

3

In the water treatment method according to the first aspect of the present invention, the acidic aqueous solution obtained in the electrolysis step may be used to clean an inside of an electrolysis apparatus used in the electrolysis step.

In the water treatment method according to the first aspect of the present invention, the acidic aqueous solution obtained in the electrolysis step may be used to neutralize the preliminary reverse osmosis membrane concentrated water adjusted to be alkaline in the water softening step.

The water treatment method according to the first aspect of the present invention may further include: a Sodium hypochlorite producing step of electrolyzing some of the electrodialysis concentrated water and producing a sodium hypochlorite aqueous solution.

A second aspect of the present invention is a water treatment apparatus that may including: a microbubble generating apparatus configured to generate microbubbles in water to be treated containing at least calcium ions and produce water to be treated containing microbubbles; a crystallization apparatus configured to crystallize calcium ions contained in the water to be treated containing the microbubbles as calcium carbonate and remove the calcium carbonate; and a reverse osmosis membrane treatment apparatus configured to separate the water to be treated, from which the calcium carbonate has been removed, into reverse osmosis membrane treated water and reverse osmosis membrane concentrated water using a reverse osmosis membrane.

The water treatment apparatus according to the second aspect of the present invention may further include: a pH adjuster configured to adjust a pH of the water to be treated containing the at least calcium ions supplied to the microbubble generating apparatus to 9 or more.

The water treatment apparatus according to the second aspect of the present invention may further include: a preliminary reverse osmosis membrane treatment apparatus configured to separate the water to be treated containing the at least calcium ions into preliminary reverse osmosis membrane treated water and preliminary reverse osmosis membrane concentrated water using a preliminary reverse osmosis membrane.

In the water treatment apparatus according to the second aspect of the present invention, in the crystallization apparatus, a hydraulic retention time of the microbubbles may be 5 to 30 seconds.

The water treatment apparatus according to the second aspect of the present invention may further include: an electrodialysis apparatus configured to separate some of the water to be treated, from which the calcium carbonate is removed, into electrodialysis concentrated water and electrodialysis diluted water through electrodialysis treatment.

The water treatment apparatus according to the second aspect of the present invention may further include: an electrolysis apparatus configured to electrolyze some of the electrodialysis concentrated water and obtain an acidic aqueous solution and an alkaline aqueous solution.

In the water treatment apparatus according to the second aspect of the present invention, the alkaline aqueous solution obtained by the electrolysis apparatus may be used by the crystallization apparatus.

In the water treatment apparatus according to the second aspect of the present invention, the acidic aqueous solution obtained by the electrolysis apparatus may be used to clean an inside of the electrolysis apparatus.

In the water treatment apparatus according to the second aspect of the present invention, the acidic aqueous solution obtained by the electrolysis apparatus may be used to neutralize the preliminary reverse osmosis membrane concentrated water adjusted to be alkaline in the crystallization apparatus.

The water treatment apparatus according to the second aspect of the present invention may further include: a Sodium hypochlorite producing apparatus configured to electrolyze some of the electrodialysis concentrated water and produce a sodium hypochlorite aqueous solution.

Advantageous Effects of Invention

According to the water treatment method and the water treatment apparatus of the present invention, the amount of various chemicals used in a process of treating water to be treated can be reduced, and the economic burden can be greatly reduced.

BRIEF DESCRIPTION OF DRAWINGS

FIG. 14 is a schematic diagram of a Sodium hypochlorite producing apparatus 351 that is an example of a Sodium hypochlorite producing apparatus.

DESCRIPTION OF EMBODIMENTS

Figure 1:
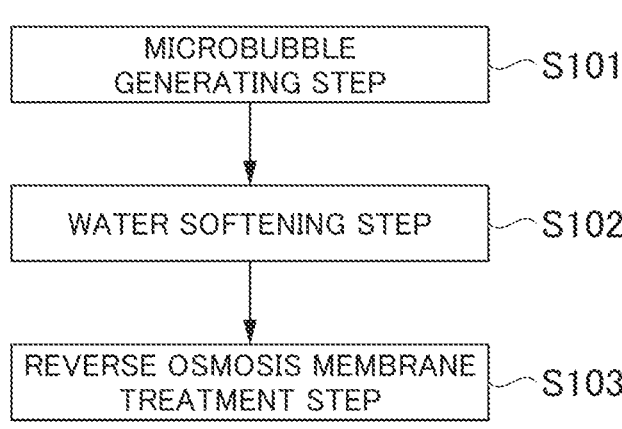
FIG. 1 is a schematic diagram of a water treatment method of a first embodiment.

Summary in recent years, according to an increase in population and improvement of living standards, the amount of tap water used is increasing and water resources are insufficient. In addition, deterioration of water quality in rivers or drainage is progressing, and countermeasures thereof are urgently needed all over the world. For example, for the purpose of sustainable use of water resources, a project to use recycled water is being considered.

Treatment for sewage among water treatments is generally divided into primary treatment, secondary treatment, and tertiary treatment.

In the primary treatment, large waste (SS: suspended substances; specifically, solid matter in sanitary sewage mixed with human waste) is removed.

In the secondary treatment, organic matter in sanitary sewage that could not be removed by the primary treatment is removed by an action of microorganisms. Nitrogen, phosphorus, recalcitrant substances, and the like, of nutrient salts are also removed by chemical, physical, and biological methods. Specifically, simple aeration treatment, activated sludge treatment, nitrification denitrification reaction treatment, and the like, are performed.

In the tertiary treatment, in order to remove suspended solid contents that cannot be removed by the secondary treatment, solid-liquid separation and turbidity management are performed using a filter medium such as filtration sand, anthracite, or the like.

In some cases, chemical treatment is introduced as the secondary treatment and the tertiary treatment. Contaminated substance separation using a coagulant or the like, contaminated substance decomposition by an oxidant such as ozone or the like, or the like, is exemplified.

Similarly, in some cases, physical treatment is introduced as the secondary treatment and the tertiary treatment, and there is separation by membrane treatment.

As a membrane used for separation by the membrane treatment, a reverse osmosis membrane (RO membrane), an ultrafiltration membrane (UF membrane), a microfiltration membrane (MF membrane), or the like, is used. Among them, the membrane treatment using a reverse osmosis membrane is attracting attention from a viewpoint of directly removing impurities other than water, such as ions, salts, or the like.

In the above-mentioned water treatment process, in order to treat the water to be treated, addition of various chemicals is essential. For example, the crystallization apparatus requires the use of chemical (an alkaline aqueous solution or the like) for the reaction of crystallization.

In addition, depending on an apparatus, it is necessary to periodically clean the apparatus chemically and physically, and at that time, it is also necessary to use various chemicals. For example, in the treatment using a chelate resin or an ion exchange resin, the chelate resin or the ion exchange resin should be cleaned periodically with chemical to recover performance.

Meanwhile, since the various chemicals used in the above-mentioned water treatment process need to be transported from the outside and stored, an economic burden is increased.

In the treatment method of the related art disclosed in the above-mentioned Patent Document 1 and 2, although the problem of transporting the chemical from the outside can be solved, the problem of storing the produced chemical has not been solved. In addition, in the treatment method disclosed in Patent Document 2, there is also a problem that separation characteristics of calcium are not sufficient. For this reason, in the treatment method of the related art, reduction in running costs was not sufficient.

In addition, in the treatment method of the related art disclosed in the above-mentioned Patent Document 3, while biological reactions by aerobic microorganisms are promoted by using micro-nano-bubbles, there is no study to improve removal characteristics of inorganic substances by a collapse phenomenon (occurrence of free radicals) of micro-nano-bubbles.

The water treatment method of the embodiment is a water treatment method having a microbubble generating step of generating microbubbles in water to be treated containing at least calcium ions and producing the water to be treated containing the microbubbles, a water softening step of crystallizing calcium ions contained in the water to be treated containing the microbubbles as calcium carbonate and removing the calcium carbonate, and a reverse osmosis membrane treatment step of separating the water to be treated, from which the calcium carbonate is removed, into reverse osmosis membrane treated water and reverse osmosis membrane concentrated water using a reverse osmosis membrane. By using the microbubbles, the amount of chemical (an alkaline aqueous solution or the like) used in the water softening step in the water treatment method can be reduced, and running costs in water treatment can be greatly reduced.

Water Treatment Method of First Embodiment

A water treatment method of a first embodiment has a microbubble generating step S101 of generating microbubbles in water to be treated (hereinafter, also simply referred to as "water to be treated") containing at least calcium ions and producing the water to be treated containing the microbubbles, a water softening step S102 of crystallizing the calcium ions contained in the water to be treated containing the microbubbles as calcium carbonate and removing the calcium carbonate, and a reverse osmosis membrane treatment step S103 of separating the water to be treated, from which the calcium carbonate is removed, into reverse osmosis membrane treated, water and reverse osmosis membrane concentrated water using a reverse osmosis membrane.

A schematic diagram of the water treatment method of the first embodiment is as shown in FIG. 1.

Water to be Treated

As the water to be treated in the water treatment method of the embodiment, underground water containing at least calcium ions, organic waste water containing at least calcium ions and that cannot be reused or discharged to rivers or the like, or the like, is exemplified. As the organic waste water, specifically, organic waste water with a high salts concentration such as seawater, human excreta, and leachate from trash landfill may be exemplified, or the like. This water to be treated generally contains impurities such as calcium ions, magnesium ions, sodium ions, silica (ionic silica, colloidal silica), chloride ions, carbonate ions, and the like (hereinafter, also referred to as various ion components).

Figure 2:
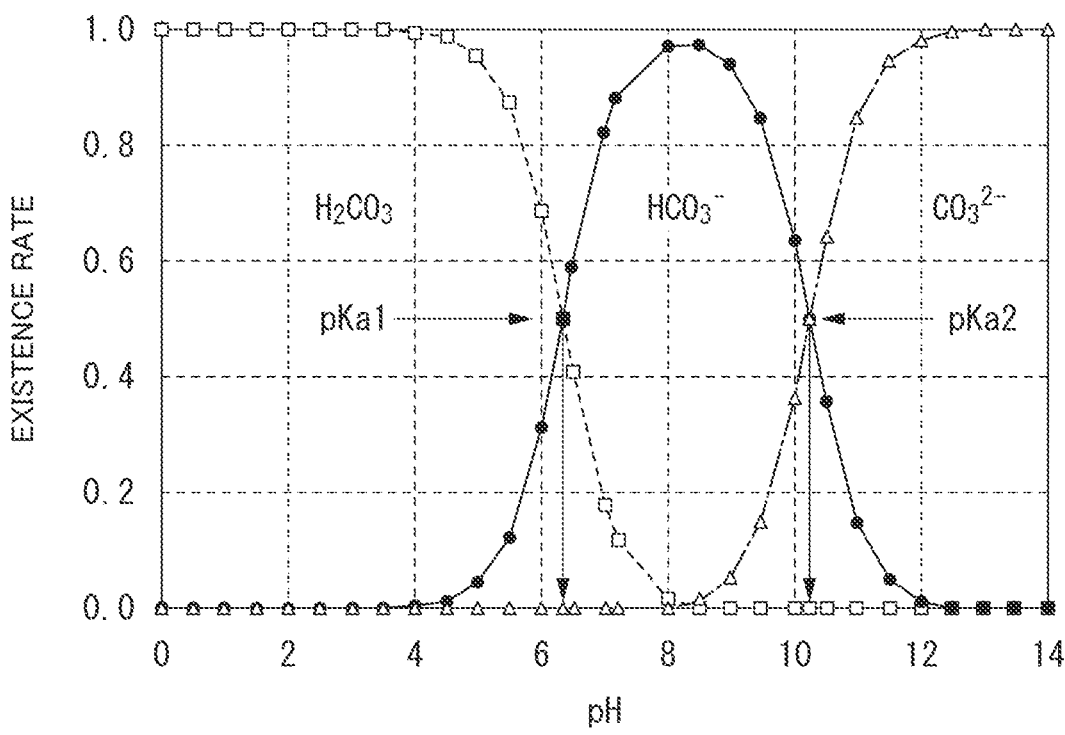
FIG. 2 is a view showing a relation between pH and a type of a carbonate ion.

Further, a molecular formula and an ionic formula of carbonate ions (carbonate material) as shown in FIG. 2 vary according to the pH. In the specification, carbonate ions (carbonate material) contain all of $H_2CO_3$, $HCO_3^-$, and $CO_3^{2-}$. That is, the carbonate ions in the specification mean $H_2CO_3$ when the water to be treated is acidic (pH is less than about 6), $HCO_3^-$ when the water to be treated is neutral (pH is about 6 to 10), and $CO_3^{2-}$ when the water to be treated is alkaline (pH exceeds about 10).

A lower limit value of the concentration of the calcium ions of the water to be treated in the water treatment method of the embodiment is, for example, 8 mg/L, or more. Meanwhile, an upper limit value of the concentration of the calcium ions in the water to be treated is, for example, 400 mg/L or less.

In addition, when the water to be treated contains chloride ions, a lower limit value of the concentration of the chloride ions in the water to be treated is, for example, 0.01 mg/L or more. Meanwhile, an upper limit value of concentration of the chloride ions in the water to be treated is, for example, 500 mg/L or less.

In addition, when the water to be treated contains alkali metal ions, a lower limit value of the concentration of the alkali metal ions in the water to be treated is, for example, 0.01 mg/L or more. Meanwhile, an upper limit value of the concentration of the alkali metal ions in the water to be treated is, for example, 500 mg/L or less.

As the water to be treated in the water treatment method of the embodiment, water to be treated containing 8 mg/L or more and 400 mg/L or less of calcium ions, 0.01 mg/L or more and 500 mg/L or less of chloride ions, and 0.01 mg/L or more and 500 mg/L or less of alkali metal ions may be exemplified.

Further, in the specification, a concentration of cations means a value measured in inductively coupled plasma (ICP) emission spectral analysis. Specifically, it is a value measured using an emission spectrophotometer (ICP-AES; SPS5520, manufactured by Seiko Instruments Inc.) that uses ICP with argon gas as a light source.

Meanwhile, a concentration of cations means a value measured using an ion chromatograph analyzer (ICA-2000; manufactured by DKK-TOA Corporation).

[Microbubble Generating Step]

The microbubble generating step S101 is a step of generating microbubbles in water to be treated containing at least calcium ions and producing the water to be treated containing the microbubbles.

In the specification, "microbubbles" mean micro air bubbles of 1 μm or more and 100 μm or less defined in ISO 20480-1: 2017.

While normal air bubbles in water burst at the water surface, microbubbles that are micro air bubbles disappear when gas-liquid interfaces shrink in the liquid. Pressure rise in the microbubbles can be obtained by the following equation (1), the atmospheric pressure rises by about 0.3 in the microbubbles with a diameter of 10 μm, the atmospheric pressure rises about 3 in the microbubbles with a diameter of 1 μm, and an extremely high pressure is formed when the microbubbles disappear (D=0).

$$dP=4\sigma/D \qquad (1)$$

(dP: pressure rise, σ: surface tension. D: air bubble diameter)

In addition, when the microbubbles disappear in the water, in addition to the increase in pressure in the microbubbles, an electric charge concentration at the interface also occurs. A concentration of the surface charge of the microbubbles is in a state in which a surface charge density becomes extremely high due to the shrinkage of the microbubbles in the water. Electrical characteristics such as a surface charge density or the like can be evaluated by a zeta potential, and the electrical characteristics are also affected by the pH of water. While the microbubbles in the water have a constant zeta potential, ions existing on the interface are concentrated when the interface is reduced. Then, a high concentration ion field is formed at the moment when the microbubbles disappear, a collapse phenomenon of the microbubbles occurs, and free radicals (for example, hydroxyl radical (—OH) or the like) are generated.

In the microbubble generating step S101, as a method of generating microbubbles, a method of generating microbubbles using a known microbubble generating apparatus is exemplified. As the microbubble generating apparatus, specifically, a microbubble generating apparatus with a liquid flow and a microbubble generating apparatus with no liquid flow are exemplified.

As the microbubble generating apparatus with a liquid flow, more specifically, a turning fluid type apparatus, a static mixer type apparatus, an ejector type apparatus, a venturi type apparatus, a pressurization dissolution type apparatus, or the like, is exemplified.

As the microbubble generating apparatus with no liquid flow, more specifically, a pore type apparatus, a rotary type apparatus, an ultrasonic type apparatus, a vapor condensing type apparatus, an electrolysis type apparatus, or the like, is exemplified.

As the microbubble generating apparatus used in the microbubble generating step S101, among the above, from the viewpoint of being more economical, the microbubble generating apparatus with a liquid flow is preferable, and a turning fluid type apparatus or a pressurization dissolution type apparatus is more preferable.

That is, the microbubble generating step S101 in the embodiment is preferably a step of generating microbubbles in water to be treated containing at least calcium ions using the microbubble generating apparatus with a liquid flow and producing the water to be treated containing the microbubbles, or more preferably a step of generating microbubbles in water to be treated containing at least calcium ions using the turning fluid type apparatus or the pressurization dissolution type apparatus and producing the water to be treated containing the microbubbles.

Gases generated in the microbubbles in the embodiment are not particularly limited, and for example, air, nitrogen, oxygen, hydrogen, helium, carbon dioxide, ozone, and mixed gases thereof, are exemplified. Among them, gases generated in the microbubbles are preferably air because it is more inexpensive.

As an average air bubble diameter of the microbubbles in the embodiment, it is preferably 1 to 50 μm.

As a measurement method of an average air bubble diameter of microbubbles, for example, it can be measured by a laser diffraction/scattering method, a nanoparticle tracking analysis method, a dynamic light scattering method, or the like.

When light hits particles, while the light is diffracted or scattered, since an intensity pattern of the diffraction/scattering light depends on the size of the particles, the laser diffraction/scattering method is a method of observing intensity patterns (intensity distributions) different according to an angle of the diffraction/scattering light and obtaining a particle diameter distribution using a Fraunhofer diffraction theory or a Mie scattering theory.

The nanoparticle tracking analysis method is a method of observing an aspect of Brownian movement of nano particles in liquid at real time according to a nano tracking analysis (NTA) technology. Since the speed of the Brownian movement of the particles depends on the particle diameter, a particle size distribution graph of the particle diameter and the particle number can be obtained by measuring the Brownian movement pattern of the particles.

A dynamic light scattering method is a method of observing an aspect of the Brownian movement of the particles scattered in the solution as fluctuations in the scattering light intensity, obtaining an autocorrelation function using a photon correlation method, and obtaining a particle diameter using a cumulant method and a histogram analysis method.

A flow rate of microbubbles (a flow rate of microbubbles/a flow rate of water to be treated) with respect to the flow rite of the water to be treated is preferably 0.01 to 0.8, and more preferably 0.01 to 0.5.

The water treatment method of the embodiment has the microbubble generating step S101, and a crystallization reaction of the water softening step S102, which will be described below, can be promoted.

Specifically, the microbubbles generated by the microbubble generating step S101 can be extinguished in the water softening step S102, which will be described below, and the calcium ions contained in the water to be treated can be crystallized and removed more efficiently by an action of free radicals generated when microbubbles disappear.

[Water Softening Step]

The water softening step S102 is a step of crystallizing the calcium ions contained in the water to be treated containing the microbubbles as calcium carbonate and removing the calcium carbonate.

Specifically, the calcium ions can be removed from the water to be treated by allowing the carbonate ions to act on the calcium ion and precipitating them as calcium carbonate with low solubility.

As the method of crystallizing the calcium carbonate front the water to be treated in the water softening step S102, specifically, a lime soda method is exemplified.

The lime soda method is a method of depositing and removing the calcium ions contained in the water to be treated as the calcium carbonate by adjusting pH such that the water to be treated becomes an alkali region and adding sodium carbonate into the water to be treated.

In the water softening step S102, a hydraulic retention time of the microbubbles is preferably 3 to 40 seconds and more preferably 5 to 30 seconds.

In the specification, the hydraulic retention time of the microbubbles means a time from generation of the microbubbles in the water tank in which the water softening step S102 is performed to shrinkage and disappearance of the microbubbles.

The hydraulic retention time of the microbubbles in the water softening step S102 can be controlled by appropriately adjusting a pressure of supplying air, an air bubble diameter of microbubbles, a flow rate of microbubbles, a flow rate of water to be treated, a pressure of a pump configured to supply water to be treated, a length of a flow channel, a structure of the flow channel (for example, a labyrinth flow channel or the like), or the like, for example, in consideration of water quality of the water to be treated. In addition, by adding a physical stimulus to the microbubbles, the microbubbles may be crushed and the hydraulic retention time may be controlled to the above-mentioned preferred time.

As the physical stimulus, for example, discharge, ultrasonic waves, or the like, is exemplified. More specifically, a method of applying a voltage of 2000 to 3000 V to microbubbles or a method of radiating ultrasonic waves with an oscillation frequency of 20 to 1000 kHz to microbubbles is exemplified.

In the water softening step S102, a T-Ca concentration in the water to be treated is preferably treated to 300 mg/L or less, and more preferably 200 mg/L or less.

Here, "the T-Ca concentration" is a total calcium concentration in the water to be treated, including not only the ions but also dissolved and non-dissociated calcium salts.

By keeping the T-Ca concentration in the water to be treated below the above-mentioned preferred range, in the reverse osmosis membrane treatment step S103, which will be described below, precipitation of calcium ion on the reverse osmosis membrane, clogging, and the like, can be further suppressed.

The water treatment method of the embodiment has the water softening step S102, and thus, the calcium ions contained in the water to be treated can be reduced. In addition, since the water treatment method of the embodiment has the microbubble generating step S101 before the water softening step S102, the calcium ions contained in the water to be treated can be reduced more efficiently.

[Reverse Osmosis Membrane Treatment Step]

The reverse osmosis membrane treatment step S103 is a step of separating the water to be treated, from which the calcium carbonate is removed, into reverse osmosis membrane treated water and reverse osmosis membrane concentrated water using a reverse osmosis membrane.

Here, the reverse osmosis membrane (RO membrane) is a membrane that is permeable to water but impermeable to impurities other than water, such as ions, salts, or the like.

The pressurized supplied water can be concentrated with the reverse osmosis membrane by the reverse osmosis membrane treatment step S103, and separated into reverse osmosis membrane treated water from which impurities other than water, such as ions, salts, or the like, are removed, and reverse osmosis membrane concentrated water in which impurities other than water, such as ions, salts, or the like, are concentrated. Further, the reverse osmosis membrane concentrated water is generally discarded.

In general, in the reverse osmosis membrane treatment in the recycled water process, 75 to 85% of the supplied water is collected as the reverse osmosis membrane treated water, and 15 to 25% is discharged as the reverse osmosis membrane concentrated water. The total dissolved solid (TDS) of the salts or the like in the supplied water is discharged from the side of the reverse osmosis membrane concentrated water.

Here, the total dissolved solid (TDS) is a substance suspended or dissolved in the water, and the total amount of substances remaining when the water is evaporated.

In the reverse osmosis membrane treatment step S103 of the embodiment, reverse osmosis membranes with different operation pressures can be used according to water quality of the supplied water.

For example, when the contents of the total dissolved solid (TD) in the supplied water exceeds 10000 mg/L, a high pressure reverse osmosis membrane is used. When the content of the total dissolved solid (TDS) in the supplied water is greater than 1000 mg/L and 10000 mg/L or less, a middle pressure reverse osmosis membrane is used. When the content of the total dissolved solid (TDS) in the supplied water is 1000 mg/L or less, a low pressure reverse osmosis membrane is used.

In the reverse osmosis membrane treatment step of the embodiment, the permeable membrane treated water can be collected at a higher percentage when the high pressure reverse osmosis membrane with a pressure resistance of 5.5 MPa (800 psi) is used.

In the water treatment method of the embodiment, by providing the reverse osmosis membrane treatment step S103, impurities other than water, such as ion, salts, or the like, contained in the water to be treated can be removed, and the treated water (reverse osmosis membrane treated water) in which the content of the total dissolved solid (TDS) is further reduced can be obtained.

[Other Arbitrary Steps]

The water treatment method of the embodiment may have other arbitrary steps. As the arbitrary steps, a preliminary reverse osmosis membrane treatment step of separating water to be treated containing at least calcium ions into preliminary reverse osmosis membrane treated water and preliminary reverse osmosis membrane concentrated water using a preliminary reverse osmosis membrane; a pH adjusting step of adjusting pH of the water to be treated containing the at least calcium ion to 9 or more before the water softening step; an electrodialysis step of separating some of the water to be treated, from which the calcium carbonate is removed, into electrodialysis concentrated water and electrodialysis diluted water through electrodialysis treatment; an electrolysis step of electrolyzing some of the electrodialysis concentrated water and obtaining an acidic aqueous solution and an alkaline aqueous solution: a sodium hypochlorite producing step of electrolyzing some of the water to be treated, from which the calcium carbonate is removed, and producing a sodium hypochlorite aqueous solution; and the like, are exemplified.

Each of the arbitrary steps will be described in detail.

The water treatment method of the above-mentioned first embodiment has the microbubble generating step S101, the water softening step S102, and the reverse osmosis membrane treatment step S103.

Since the water treatment method of the first embodiment has the microbubble generating step S101, the amount of chemical (alkaline aqueous solution or the like) used in the water softening step S102 can be reduced.

In addition, since the calcium ions can be removed more efficiently by the water softening step S102, precipitation of the calcium ions on the reverse osmosis membrane in the reverse osmosis membrane treatment step S103, clogging, and the like, can be suppressed. For this reason, the amount of the chemical used to clean the reverse osmosis membrane can also be reduced.

Accordingly, according to the water treatment method of the first embodiment, running costs in treatment of the water to be treated can be greatly reduced.

Water Treatment Method of Second Embodiment

A water treatment method of a second embodiment is a water treatment method having a pH adjusting step S204 of adjusting pH of water to be treated containing at least calcium ions to 9 or more, a microbubble generating step S201 of generating microbubbles in the water to be treated, the pH of which is adjusted, and producing the water to be treated containing the microbubbles, a water softening step S202 of crystallizing calcium ions contained in the water to be treated containing the microbubbles as calcium carbonate and removing the calcium carbonate, and a reverse osmosis membrane treatment step S203 of separating the water to be treated, from which the calcium carbonate is removed, into reverse osmosis membrane treated water and reverse osmosis membrane concentrated water using a reverse osmosis membrane.

Figure 3:
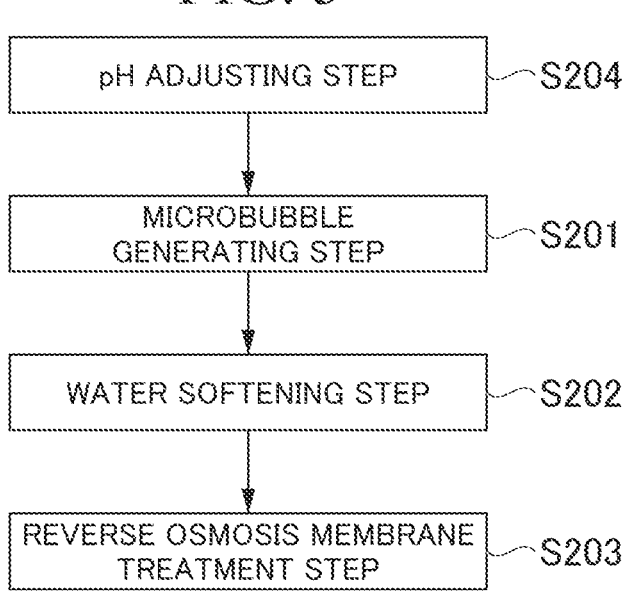
FIG. 3 is a schematic diagram of a water treatment method of a second embodiment.

A schematic diagram of the water treatment method of the second embodiment is as shown in FIG. 3.

[pH Adjusting Step]

The pH adjusting step S204 is a step of adjusting pH of the water to be treated containing at least calcium ions to 9 or more.

Further, in the specification, the pH of the aqueous solution means a value obtained by measuring pH of the aqueous solution at 25° C. using a pH meter (D74, manufactured by HORIBA Corporation).

The pH adjusting step S204 may be performed before the water softening step S202, or may be performed between the microbubble generating step S201 and the water softening step S202.

The pH adjusting step can be performed by adding known base (for example, sodium hydroxide) into the water to be treated.

By adding the base into the water to be treated containing at least calcium ions and further enhancing the alkalinity, it is possible to enhance characteristics of the interface with negative electric charges of the microbubbles generated in the microbubble generating step S201, which will be described below, and amplify free radicals at the time of disappearance. Accordingly, calcium ions are likely to be removed in the water softening step S102, which will be described below.

In the pH adjusting step S204, the calcium ions contained in the water to be treated in the water softening step S202, which will be described below, are preferably further crystallized as calcium carbonate, and from a viewpoint of more easily removing the calcium carbonate, the pH of the water to be treated containing at least calcium ions is preferably adjusted to 8.3 or more and less than 10.

In a general water softening step, while it is necessary to adjust the pH of the water to be treated to over 10, in the water treatment method of the embodiment, since the water to be treated in the water softening step S102 contains the microbubbles, even when the pH of the water to be treated is lower than the pH of the water to be treated in the water softening step in the related art, the calcium ions contained in the water to be treated can be sufficiently crystallized as calcium carbonate, and the calcium carbonate can be sufficiently removed. When the pH is less than the above-mentioned upper limit value, it is more economical because the amount of base used can be reduced.

Since the water treatment method of the embodiment has the pH adjusting step S204, the calcium ions contained in the water to be treated can be crystallized in the water softening step S202, which will be described below, as calcium carbonate, and the calcium carbonate can be more easily removed.

[Microbubble Generating Step, Water Softening Step, Reverse Osmosis Membrane Treatment Step]

The microbubble generating step S201, the water softening step S202, and the reverse osmosis membrane treatment step S203 are the same steps as the microbubble generating step S101, the water softening step S102, and the reverse osmosis membrane treatment step S103, which are described above.

[Other Arbitrary Steps]

Even in the water treatment method of the embodiment, the above-mentioned other arbitrary steps may be provided.

The water treatment method of the above-mentioned second embodiment has the pH adjusting step S204, the microbubble generating step S201, the water softening step S202, and the reverse osmosis membrane treatment step S203.

Since the water treatment method of the second embodiment has the pH adjusting step S204 in addition to the steps of the water treatment method of the first embodiment, the calcium ions can be removed more efficiently.

Accordingly, according to the water treatment method of the second embodiment, running costs in treatment of the water to be treated can be further reduced.

Water Treatment Method of Third Embodiment

A water treatment method of a third embodiment has a preliminary reverse osmosis membrane treatment step S305 of separating water to be treated containing at least calcium ions into preliminary reverse osmosis membrane treated water and preliminary reverse osmosis membrane concentrated water using a preliminary reverse osmosis membrane, a pH adjusting step S304 of adjusting pH of the preliminary reverse osmosis membrane concentrated water to 9 or more, a microbubble generating step S301 of generating microbubbles in the preliminary reverse osmosis membrane concentrated water, the pH of which is adjusted, and producing preliminary reverse osmosis membrane concentrated water containing microbubbles, a water softening step S302 of crystallizing calcium ions contained in the preliminary reverse osmosis membrane concentrated water containing the microbubbles as calcium carbonate and removing the calcium carbonate, and a reverse osmosis membrane treatment step S303 of separating the preliminary reverse osmosis membrane concentrated water, from which the calcium carbonate is removed, into reverse osmosis membrane treated water and reverse osmosis membrane concentrated water using a reverse osmosis membrane.

Figure 4:
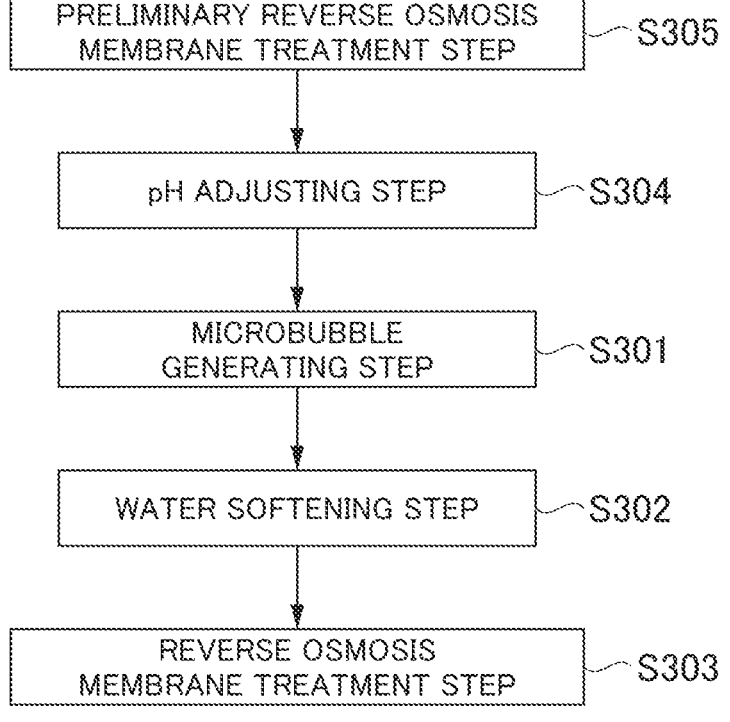
FIG. 4 is a schematic diagram of a water treatment method of a third embodiment.

A schematic diagram of the water treatment method of the third embodiment is as shown in FIG. 4.

[Preliminary Reverse Osmosis Membrane Treatment Step]

The preliminary reverse osmosis membrane treatment step S305 is a step of separating water to be treated containing at least calcium ions into preliminary reverse osmosis membrane treated water and preliminary reverse osmosis membrane concentrated water using a preliminary reverse osmosis membrane.

The preliminary reverse osmosis membrane treatment step S305 is the same step as the reverse osmosis membrane treatment step S103. That is, in the water treatment method of the embodiment, the preliminary reverse osmosis membrane treatment step S305 and the reverse osmosis membrane treatment step S303 may be the same step or may be different steps. In addition, the reverse osmosis membrane treatment step may be repeated using the same apparatus.

When the preliminary reverse osmosis membrane treatment step S305 and the reverse osmosis membrane treatment step S303 are different from each other, for example, the case in which the reverse osmosis membrane treatment step S303 is performed using the reverse osmosis membrane with a higher pressure resistance is exemplified. In the treatment method of the embodiment, since the treatment is performed using the preliminary reverse osmosis membrane concentrated water, there are many contents such as various ion components in water, and the reverse osmosis membrane used in the reverse osmosis membrane treatment step S303 is more stressful.

[pH Adjusting Step, Microbubble Generating Step, Water Softening Step, Reverse Osmosis Membrane Treatment Step]

The pH adjusting step S304, the microbubble generating step S301, the water softening step S302, and the reverse osmosis membrane treatment step S303 are the same steps as the pH adjusting step S204, the microbubble generating step S201, the water softening step S202, and the reverse osmosis membrane treatment step S203, which are described above in detail.

[Other Arbitrary Steps]

Even in the water treatment method of the embodiment, the above-mentioned other arbitrary steps may be provided.

The water treatment method of the above-mentioned third embodiment has the preliminary reverse osmosis membrane treatment step S305, the pH adjusting step S304, the microbubble generating step S301, the water softening step S302, and the reverse osmosis membrane treatment step S303.

Since the water treatment method of the third embodiment has the preliminary reverse osmosis membrane treatment step S305 in addition to each of the steps of the water treatment method of the second embodiment, impurities other than water, such as ions, salts, or the like, included in the water to be treated can be further removed, and treated water (reverse osmosis membrane treated water) with a further reduced content of the total dissolved solid (TDS) can be obtained. In addition, a recovery rate of the reverse osmosis membrane treated water can be further improved.

Water Treatment Method of Fourth Embodiment

A water treatment method of a fourth embodiment includes a preliminary reverse osmosis membrane treatment step S405 of separating water to be treated containing at least calcium ions into preliminary reverse osmosis membrane treated water and preliminary reverse osmosis membrane concentrated water using a preliminary reverse osmosis membrane, a pH adjusting step S404 of adjusting pH of the preliminary reverse osmosis membrane concentrated water to 9 or more, a microbubble generating step S401 of generating microbubbles in the preliminary reverse osmosis membrane concentrated water, the pH of which is adjusted, and producing preliminary reverse osmosis membrane concentrated water containing microbubbles, a water softening step S402 of crystallizing calcium ions contained the preliminary reverse osmosis membrane concentrated water containing the microbubbles as calcium carbonate and removing the calcium carbonate, a reverse osmosis membrane treatment step S403 of separating preliminary reverse osmosis membrane concentrated water, from which the calcium carbonate is removed, into reverse osmosis membrane treated water and reverse osmosis membrane concentrated water using a reverse osmosis membrane, an electrodialysis step S406 of separating some of the preliminary reverse osmosis membrane concentrated water, from which the calcium carbonate is removed, into electrodialysis concentrated water and electrodialysis diluted water through electrodialysis treatment, an electrolysis step S407 of electrolyzing some of the electrodialysis concentrated water and obtaining an acidic aqueous solution and an alkaline aqueous solution, and a sodium hypochlorite producing step S408 of electrolyzing some of the electrodialysis concentrated water and producing a sodium hypochlorite aqueous solution.

Figure 5:
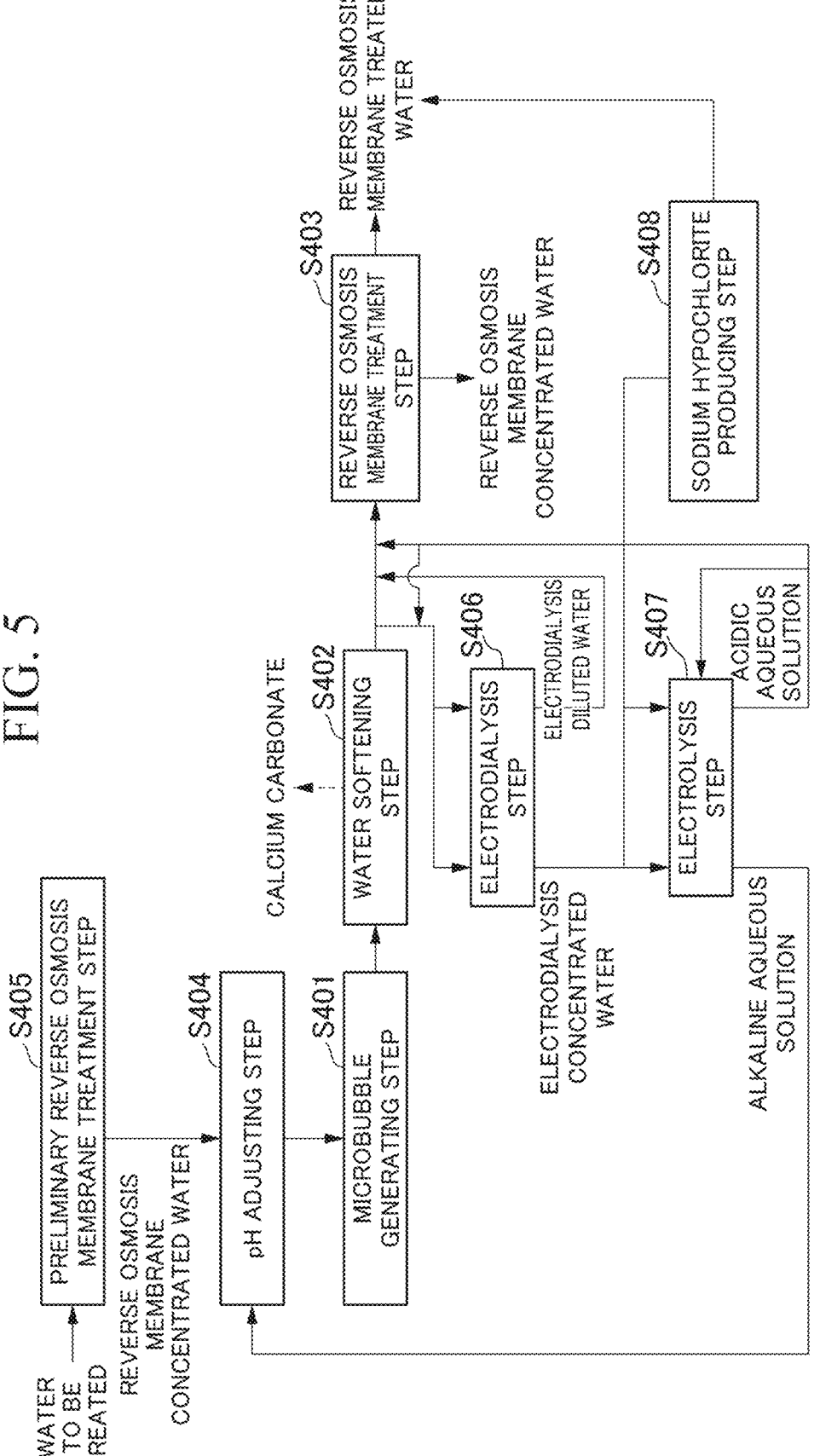
FIG. 5 is a schematic diagram of a water treatment method of a fourth embodiment.
Figure 6:
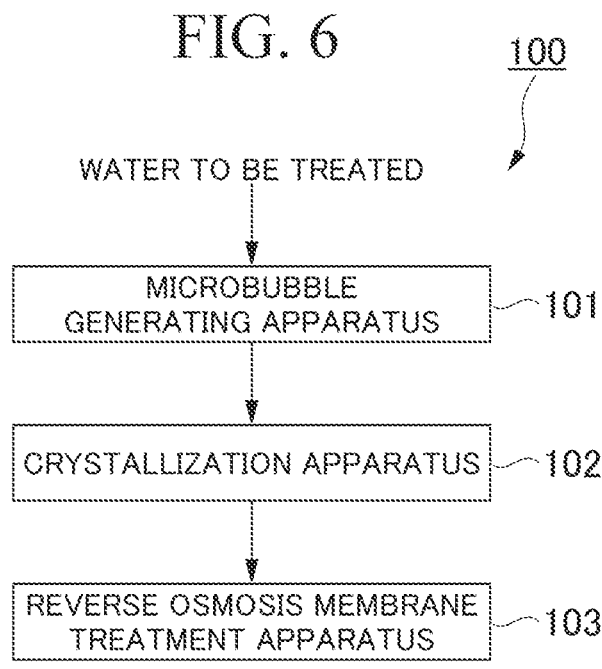
FIG. 6 is a schematic diagram of a water treatment apparatus 100 of the first embodiment.

A schematic diagram of the water treatment method of the fourth embodiment is as shown in FIG. 5.

Further, as described above, the water to be treated containing at least calcium ions typically contains the above-mentioned various ion components.

In the detailed description of each of the steps in the water treatment method of the embodiment, when the acid, base, or the like, is produced using the ion components other than the calcium ions contained in the water to be treated, naturally, the water to be treated containing the ion components is used in addition to the calcium ions.

[Preliminary Reverse Osmosis Membrane Treatment Step, pH Adjusting Step, Microbubble Generating Step, Water Softening Step, Reverse Osmosis Membrane Treatment Step]

The preliminary reverse osmosis membrane treatment step S405, the pH adjusting step S404, the microbubble generating step S401, the water softening step S402, and the reverse osmosis membrane treatment step S403 are the same steps as the preliminary reverse osmosis membrane treatment step S305, the pH adjusting step S304, the microbubble generating step S301, the water softening step S302, and the reverse osmosis membrane treatment step S303, which are described above in detail.

[Electrodialysis Step]

The electrodialysis step S406 is a step of separating some of the preliminary reverse osmosis membrane concentrated water, from which the calcium carbonate is removed, into electrodialysis concentrated water and electrodialysis diluted water through electrodialysis treatment.

Specifically, by arranging a plurality of electrodialysis membrane and supplying the preliminary reverse osmosis membrane concentrated water, from which the calcium carbonate is removed, into the electrodialysis apparatus including the concentration chamber and the diluting chamber formed alternately to conduct electricity, electrodialysis concentrated water containing various ion components at a high concentration can be obtained in the concentration chamber, and electrodialysis diluted water containing various ion components at a low concentration can be obtained in the diluting chamber.

Further, in order to obtain the electrodialysis concentrated water, dialysis water (for example, tap water or the like) with small multivalent ions may be supplied into the concentration chamber in the electrodialysis apparatus using the electrodialysis step S406, instead of the preliminary reverse osmosis membrane concentrated water (water to be treated) or in addition to the preliminary reverse osmosis membrane concentrated water (water to be treated).

By supplying the dialysis water with small multivalent ions into the concentration chamber in the electrodialysis apparatus used in the electrodialysis step S46, producing efficiency of the acidic aqueous solution and the alkaline aqueous solution can be improved in the electrolysis step S407, which will be described below.

As the electrodialysis apparatus used in the electrodialysis step S406, for example, there is an apparatus including alternately univalent anion selective permeability ion exchange membranes configured to fix positive charge to the membranes, and univalent cation selective permeability ion exchange membranes configured to fix negative charges to membranes. In the apparatus, the electrodialysis concentrated water containing alkali metal ions or the like (univalent cations) and chloride ions or the like (univalent anions) at a high concentration can be obtained in the concentration chamber, and the electrodialysis diluted water containing alkali metal ions or the like (univalent cations) and chloride ions or the like (univalent anions) at a low concentration can be obtained in the diluting chamber. Further, since multivalent ions (magnesium ions, sulfate ions, or the like) generally contained in the preliminary reverse osmosis membrane concentrated water (water to be treated) cannot pass through the univalent cation selective permeability ion exchange membrane and the univalent anion selective permeability ion exchange membrane, the multivalent ions in the electrodialysis concentrated water can be removed.

Before the electrodialysis step S406 in the embodiment, a step of adjusting pH of the preliminary reverse osmosis membrane concentrated water (water to be treated) supplied to the electrodialysis apparatus, i.e., the preliminary reverse osmosis membrane concentrated water (water to be treated), from which the calcium carbonate is removed by the water softening step S402, may be provided. It is preferable to adjust the pH of the preliminary reverse osmosis membrane concentrated water (water to be treated) by mixing the acidic aqueous solutions obtained in the electrolysis step S407, which will be described below, when the pH is adjusted. The pH of the preliminary reverse osmosis membrane concentrated water (water to be treated) is preferably adjusted to 10 or less or may be adjusted to 3 to 9.

Accordingly, deterioration of the univalent anion selective permeability ion exchange membrane and the univalent cation selective permeability ion exchange membrane provided in the electrodialysis apparatus used in the electrodialysis step S406 can be further suppressed.

When the water treatment method of the embodiment has the electrodialysis step S406, since the concentration of the univalent cations (alkali metal ions) in the preliminary reverse osmosis membrane concentrated water (water to be treated) can be increased, the alkaline aqueous solution can be generated more efficiently in the electrolysis step S407, which will be described below. In addition, it is possible to previously remove multivalent ions that can be easily adhered to the electrolysis apparatus used in the electrolysis step S407.

[Electrolysis Step]

The electrolysis step S407 is a step of electrolyzing some of the electrodialysis concentrated water and obtaining an acidic aqueous solution and an alkaline aqueous solution.

Specifically, there is a method of causing an oxidation reaction on an anode and a reduction reaction on a cathode and obtaining an acidic aqueous solution and an alkaline aqueous solution by applying a voltage to the pair of electrodes (positive electrode: anode, negative electrode: cathode) having electron conductivity and electrolyte having ion conductivity.

For example, the electrolysis step S407 can be performed using a two-chamber electrolysis apparatus (FIG. 12) and a three-chamber electrolysis apparatus (FIG. 13), which will be described below.

In the electrolysis step S407, for example, when electrodialysis concentrated water (water to be treated) containing sodium ions and chloride ions is electrolyzed, the reaction represented by the following equation (2) proceeds to obtain a sodium hydroxide aqueous solution (alkaline aqueous solution) and hydrochloric acid (acidic aqueous solution).

$$NaCl+2H_2O=NaOH+HCl+H_2+\frac{1}{2}O_2 \qquad (2)$$

For example, in the two-chamber electrolysis apparatus (FIG. 12), which will be described below, a mixture of hydrochloric acid and salt water is obtained as the acidic aqueous solution, and a mixture of sodium hydroxide and salt water is obtained as the alkaline aqueous solution.

Meanwhile, in the three-chamber electrolysis apparatus (FIG. 13), which will be described below, the sodium hydroxide aqueous solution is obtained in the cathode chamber, and the hydrochloric acid is obtained in the anode chamber.

The sodium hydroxide obtained by the reaction may be used in the water softening step S402.

The acidic aqueous solution obtained in the electrolysis step S407 may be used to clean the inside of the electrolysis apparatus used in the electrolysis step S407. A long-term continuous operation of the electrolysis apparatus causes precipitation of hardness components on the barrier membrane or the cathode in the electrolysis apparatus and a decrease in performance of the electrolysis apparatus. For this reason, the electrolysis apparatus is preferably intermittently stopped to clean the acidic aqueous solution obtained in the electrolysis step S407. While the frequency of cleaning depends on the water quality and the operation condition, it is preferable to perform the cleaning every several hours to several tens of hours for several tens of minutes to several hours.

Further, since the cleaning is a necessary step of continuously obtaining the acidic aqueous solution and the alkaline aqueous solution in the electrolysis step S407, the cleaning may be a step performed upon stoppage of the electrolysis apparatus used in the electrolysis step S407 or may be included in the electrolysis step S407. That is, in the specification, even when the acidic aqueous solution is used to clean the inside of the electrolysis apparatus used in the electrolysis step S407, the acidic aqueous solution is expressed as being used in the electrolysis step S407.

Further, the acidic aqueous solution obtained by the reaction may be used to neutralize the preliminary reverse osmosis membrane concentrated water (water to be treated) adjusted to alkalinity in the water softening step S402 after the water softening step S402.

Further, in the water softening step S402, the step of neutralizing the preliminary reverse osmosis membrane concentrated water (water to be treated) adjusted to alkalinity after the water softening step S402 is also included in the electrolysis step S407 because it is a step of adjusting the pH of the electrodialysis concentrated water (water to be treated) used in the electrolysis step S407 later. That is, in the specification, even when the acidic aqueous solution is used to adjust the pH of the water to be treated supplied to the electrolysis apparatus used in the electrolysis step S407, the acidic aqueous solution is expressed as being used in the electrolysis step S407.

While a flow of using the acidic aqueous solution obtained in the electrolysis step S407 to clean the electrolysis apparatus and adjust the pH of the preliminary reverse osmosis membrane concentrated water (water to be treated), from which the calcium carbonate is removed, is shown in the schematic diagram of the water treatment method of the fourth embodiment shown in FIG. 5, the step of using the acidic aqueous solution is an arbitrary step, and these steps may not be provided.

While the acidic aqueous solution and the alkaline aqueous solution are obtained by the electrodialysis step S406 and the electrolysis step S407 in the water treatment method of the embodiment, the acidic aqueous solution and the alkaline aqueous solution may be obtained by only the electrodialysis step without providing the electrolysis step. That is, for example, a step of obtaining an alkaline aqueous solution and an acidic aqueous solution through electrodialysis of some of the preliminary reverse osmosis membrane concentrated water, front which the calcium carbonate is removed, using a bipolar membrane may be provided.

[Sodium Hypochlorite Producing Step]

The sodium hypochlorite producing step S408 is a step of electrolyzing some of the electrodialysis concentrated water and producing a sodium hypochlorite aqueous solution.

By appropriately selecting the anode or the like of the electrolysis apparatus using the electrolysis apparatus for producing the sodium hypochlorite aqueous solution, a reaction such as the following equation (3) occurs, and sodium hypochlorite can be produced from the chloride ions contained in the water to be treated.

$$2Cl^-=Cl_2+2e^-$$

$$2NaOH+Cl_2 \rightarrow NaCl+NaClO+H_2O \tag{3}$$

The sodium hypochlorite can be used as disinfectant of the treated water (reverse osmosis membrane treated water). The hypochlorous acid components exist as hypochlorous acid ions in an alkaline region and as hypochlorous acid in an acidic region, and both can be produced by changing the pH of the electrolyzing solution. It is known that sterilizing power is higher in the latter. Sodium hypochlorite in the specification refers to them collectively.

The water treatment method of the above-mentioned fourth embodiment has the preliminary reverse osmosis membrane treatment step S405, the pH adjusting step S404, the microbubble generating step S401, the water softening step S402, the reverse osmosis membrane treatment step S403, the electrodialysis step S406, the electrolysis step S407, and the sodium hypochlorite producing step S408.

Since the water treatment method of the fourth embodiment has the electrodialysis step S406, the electrolysis step S407, and the sodium hypochlorite producing step S408, the liquid chemical required for the step can be produced and used on-site, transportation and storage of chemicals from the outside are not required, and an economic burden can be further reduced.

Water Treatment Apparatus of First Embodiment

A water treatment apparatus 100 of the first embodiment includes a microbubble generating apparatus 101 configured to generate microbubbles in water to be treated containing at least calcium ions and producing the water to be treated containing microbubbles, a crystallization apparatus 102 configured to crystallize calcium ions contained in the water to be treated containing the microbubbles as calcium carbonate and remove the calcium carbonate, and a reverse osmosis membrane treatment apparatus 103 configured to separate the water to be treated, from which the calcium carbonate is removed, into reverse osmosis membrane treated water and reverse osmosis membrane concentrated water using a reverse osmosis membrane.

The microbubble generating apparatus 101, the crystallization apparatus 102, and the reverse osmosis membrane treatment apparatus 103 are connected to each other by, for example, a pipeline.

A schematic diagram of the water treatment apparatus 100 of the first embodiment is as shown in FIG. 5.

[Microbubble Generating Apparatus]

As the microbubble generating apparatus 101, a known apparatus capable of generating microbubbles can be used. As the microbubble generating apparatus 101, specifically, a microbubble generating apparatus with a liquid flow and a microbubble generating apparatus with no liquid flow are exemplified.

As the microbubble generating apparatus with a liquid flow, more specifically, a turning fluid type apparatus, a static mixer type apparatus, an ejector type apparatus, a venturi type apparatus, a pressurization dissolution type apparatus, or the like, is exemplified.

As the microbubble generating apparatus with no liquid flow, more specifically, a pore type apparatus, a rotary type apparatus, an ultrasonic type apparatus, a vapor condensing type apparatus, an electrolysis type apparatus, or the like, is exemplified.

As the microbubble generating apparatus 101, among the above, from a viewpoint of being more economical, the microbubble generating apparatus with a liquid flow is preferable, or the turning fluid type apparatus or the pressurization dissolution type apparatus is more preferable.

The water treatment apparatus 100 includes the microbubble generating apparatus 101, and thus, a crystallization reaction of the crystallization apparatus 102, which will be described below, can be promoted,

[Crystallization Apparatus]

As the crystallization apparatus 102, a known apparatus capable of depositing and removing calcium carbonate can be used.

Figure 7:
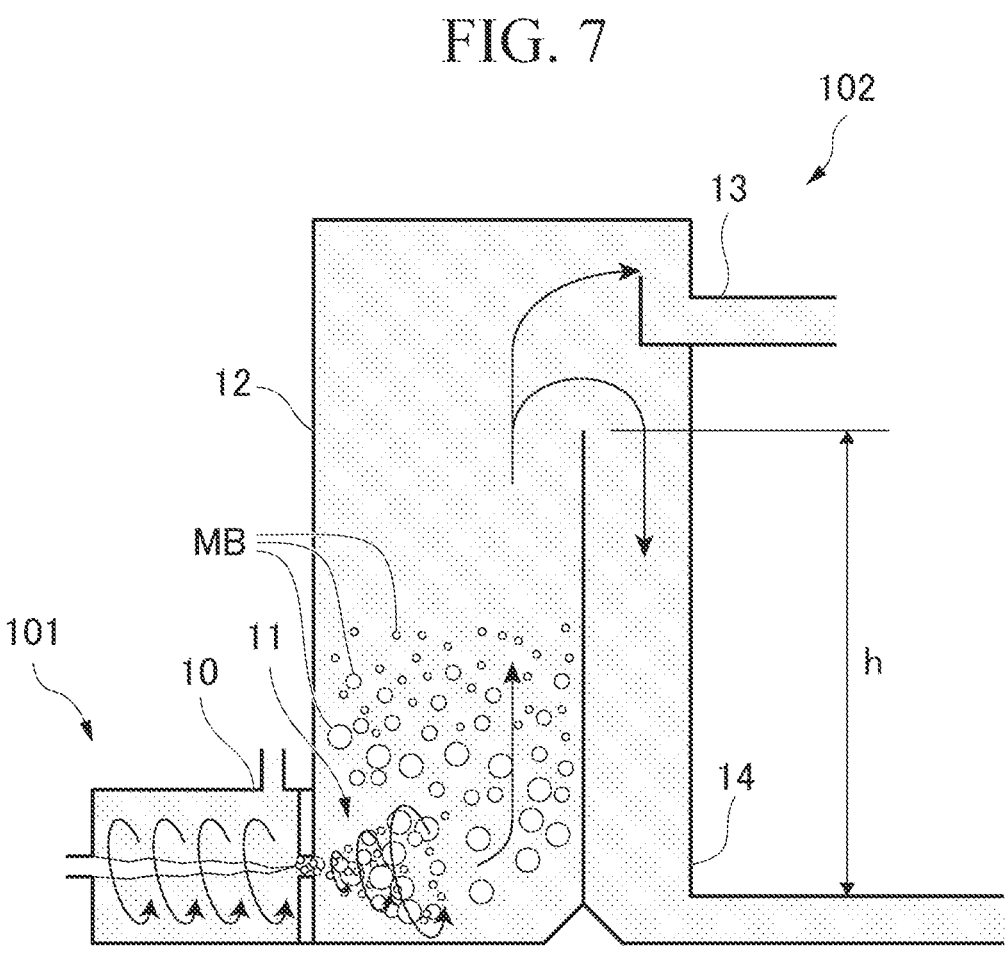
FIG. 7 is a schematic diagram of a microbubble generating apparatus 101 and a crystallization apparatus 102.

A preferred aspect of the microbubble generating apparatus 101 and the crystallization apparatus 102 in the water treatment apparatus 100 is shown in FIG. 7.

A microbubble generating part 10 of the microbubble generating apparatus 101 is connected to a water to be treated introducing part 11 of the crystallization apparatus 102, and microbubbles MB generated by the microbubble generating part 10 of the microbubble generating apparatus 101 are diffused in the crystallization apparatus 102.

The microbubble generating apparatus 101 generate the microbubbles MB in the microbubble generating part 10 by swirling and shearing water. Specifically, air bubbles created by a compressor or self-breathing air are made finer by water turbulence or the like, and the microbubbles MB are generated.

The crystallization apparatus 102 is constituted by a crystallization crystallizing part 12 configured to generate a crystallization reaction, a crystallization supernatant recovering part 13 configured to collect supernatant (water to be treated, from which calcium carbonate is removed), and a crystal precipitation discharge part 14 configured to discharge crystal precipitation (calcium carbonate) from the crystallization apparatus.

The microbubbles MB are extinguished in the crystallization crystallizing part 12 to accelerate a crystallization reaction. The water to be treated containing the crystal precipitation (calcium carbonate) has a structure that overflows along a flow channel, and an overflow wall height h is optimized for water quality and water quantity of the water to be treated for the crystallization reaction.

The water treatment apparatus 100 includes the crystallization apparatus 102, and thus, the calcium ions contained in the water to be treated can be reduced. In addition, since the water treatment apparatus 100 includes the microbubble generating apparatus 101 upstream from the crystallization apparatus 102, the calcium ions contained in the water to be treated can be reduced more efficiently.

[Reverse Osmosis Membrane Treatment Apparatus]

The reverse osmosis membrane treatment apparatus 103 is an apparatus for separating water to be treated, from which calcium carbonate is removed, into reverse osmosis membrane treated water and reverse osmosis membrane concentrated water using a reverse osmosis membrane. As the reverse osmosis membrane, reverse osmosis membranes with different operating pressures can be used according to the water quality of the supplied water.

Commercially available examples of the reverse osmosis membrane include TM720-400 or the like produced by Toray Corporation.

Since the water treatment apparatus 100 includes the reverse osmosis membrane treatment apparatus 103, impurities other than water, such as ions, salts, or the like, contained in the water to be treated can be removed, and the treated water (reverse osmosis membrane treated water) with a reduced content of the total dissolved solid TDS) can be produced.

[Other Apparatuses]

The water treatment method of the embodiment may include other apparatuses. As the other apparatuses, a preliminary reverse osmosis membrane apparatus configured to separate water to be treated containing at least calcium ions into preliminary reverse osmosis membrane treated water and preliminary reverse osmosis membrane concentrated water using a preliminary reverse osmosis membrane; a pH1 adjuster provided upstream from the crystallization apparatus and configured to adjust pH of the water to be treated containing the at least calcium ions to 9 or more; an electrodialysis apparatus configured to separate some of the water to be treated, from which the calcium carbonate is removed, into electrodialysis concentrated water and electrodialysis diluted water through electrodialysis treatment; an electrolysis apparatus configured to electrolyze some of the electrodialysis concentrated water and obtain an acidic aqueous solution and an alkaline aqueous solution; a sodium hypochlorite producing apparatus configured to electrolyze some of the water to be treated, from which the calcium carbonate is removed, and producing a sodium hypochlorite aqueous solution; and the like, are exemplified.

Each of the other apparatuses will be described below in detail.

The water treatment apparatus 100 of the above-mentioned first embodiment includes the microbubble generating apparatus 101, the crystallization apparatus 102, and the reverse osmosis membrane treatment apparatus 103.

The water treatment apparatus 100 of the first embodiment includes the microbubble generating apparatus 101, and thus, the amount of chemical (alkaline aqueous solution or the like) used in the crystallization apparatus 102 can be reduced. Since the crystallization apparatus 102 can remove the calcium ions more efficiently, clogging of the reverse osmosis membrane in the reverse osmosis membrane treatment apparatus 103 can be suppressed. For this reason, the amount of chemical used to clean the reverse osmosis membrane can also be reduced.

Accordingly, according to the water treatment apparatus 100 of the first embodiment, treatment (if the water to be treated can be performed at a low running cost.

Water Treatment Apparatus of Second Embodiment

A water treatment apparatus 200 of the second embodiment includes a pH adjuster 204 configured to adjust a pH of water to be treated containing at least calcium ions to 9 or more, a microbubble generating apparatus 201 configured to generate microbubbles in the water to be treated, the pH of which is adjusted, and produce water to be treated containing microbubbles, a crystallization apparatus 202 configured to crystallize calcium ions contained in the water to be treated containing the microbubbles as calcium carbonate and remove the calcium carbonate, and a reverse osmosis membrane treatment apparatus 203 configured to separate the water to be treated, from which the calcium carbonate is removed, into reverse osmosis membrane treated water and reverse osmosis membrane concentrated water using a reverse osmosis membrane.

The pH adjuster 204, the microbubble generating apparatus 201, the crystallization apparatus 202, and the reverse osmosis membrane treatment apparatus 203 are connected to each other by, for example, a pipeline.

Figure 8:
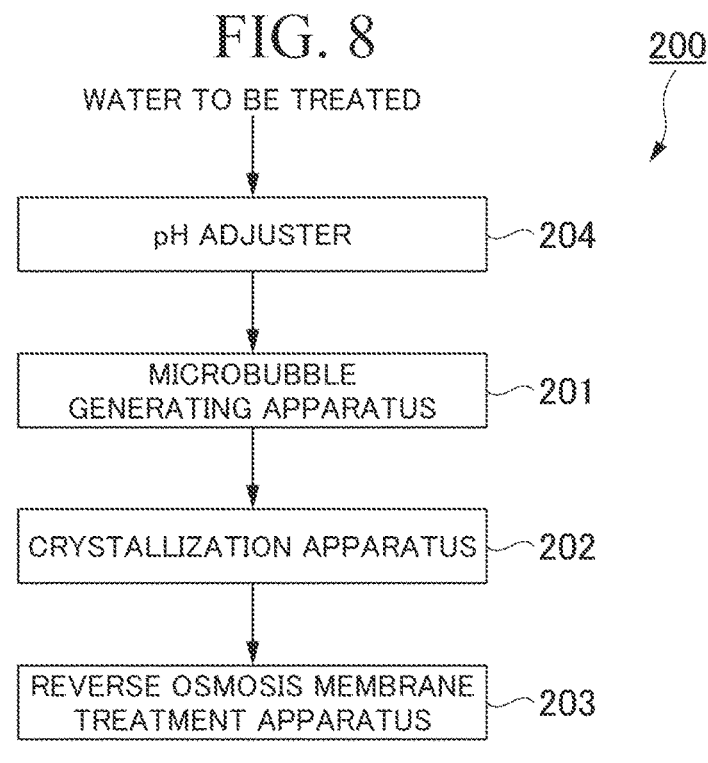
FIG. 8 is a schematic diagram of a water treatment apparatus 200 of the second embodiment.

A schematic diagram of the water treatment apparatus 200 of the second embodiment is as shown in FIG. 8.

[pH Adjuster]

The pH adjuster 204 is a member including, for example, a pH meter and an alkaline aqueous solution input part.

In the water treatment apparatus 200 of the embodiment, the pH of the water to be treated is adjusted to 9 or more by the pH adjuster 204.

[Microbubble Generating Apparatus, Crystallization Apparatus, Reverse Osmosis Membrane Treatment Apparatus]

The microbubble generating apparatus 201, the crystallization apparatus 202, and the reverse osmosis membrane treatment apparatus 203 are exemplified as the same apparatuses as the microbubble generating apparatus 101, the crystallization apparatus 102, and the reverse osmosis membrane treatment apparatus 103, respectively.

[Other Apparatuses]

Even in the water treatment apparatus 200 of the embodiment, the above-mentioned other apparatuses may be provided.

The water treatment apparatus 200 of the above-mentioned second embodiment includes the pH adjuster 204, the microbubble generating apparatus 201, the crystallization apparatus 202, and the reverse osmosis membrane treatment apparatus 203.

Since the water treatment apparatus 200 of the second embodiment has the pH adjuster 204 in addition to each of the apparatuses of the water treatment apparatus 100 of the first embodiment, the calcium ions can be removed more efficiently.

Accordingly, according to the water treatment apparatus 200 of the second embodiment, running costs in treatment of the water to be treated can be further reduced.

Water Treatment Apparatus of Third Embodiment

A water treatment apparatus 30 of a third embodiment includes a preliminary reverse osmosis membrane treatment apparatus 305 configured to separate water to be treated containing at least calcium ions into preliminary reverse osmosis membrane treated water and preliminary reverse osmosis membrane concentrated water using a preliminary reverse osmosis membrane, a pH adjuster 304 configured to adjust pH of the preliminary reverse osmosis membrane concentrated water to 9 or more, a microbubble generating apparatus 301 configured to generate microbubbles in the preliminary reverse osmosis membrane concentrated water, the pH of which is adjusted, and produce the preliminary reverse osmosis membrane concentrated water containing microbubbles, a crystallization apparatus 302 configured to crystallize calcium ions contained in the preliminary reverse osmosis membrane concentrated water containing the microbubbles as calcium carbonate and remove the calcium carbonate, and a reverse osmosis membrane treatment apparatus 303 configured to separate the preliminary reverse osmosis membrane concentrated water, from which the calcium carbonate is removed, into reverse osmosis membrane treated water and reverse osmosis membrane concentrated water using a reverse osmosis membrane.

The preliminary reverse osmosis membrane treatment apparatus 305, the pH adjuster 304, the microbubble generating apparatus 301, the crystallization apparatus 302, and the reverse osmosis membrane treatment apparatus 303 are connected to each other by, for example, a pipeline.

Figure 9:
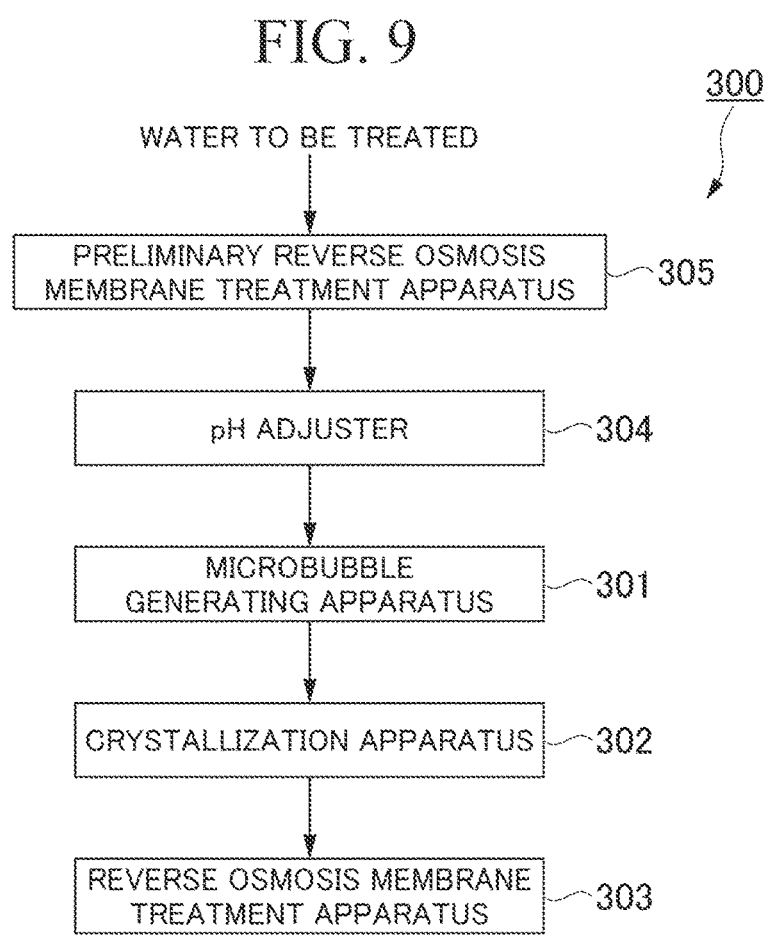
FIG. 9 is a schematic diagram of a water treatment apparatus 300 of the third embodiment.

A schematic diagram of the water treatment apparatus 300 of the third embodiment is as shown in FIG. 9.

[Preliminary Reverse Osmosis Membrane Treatment Step]

The preliminary reverse osmosis membrane treatment apparatus 305 is an apparatus configured to separate water to be treated containing at least calcium ions into preliminary reverse osmosis membrane treated water and preliminary reverse osmosis membrane concentrated water using a preliminary reverse osmosis membrane.

The preliminary reverse osmosis membrane treatment apparatus 305 is the same apparatus as the reverse osmosis membrane treatment apparatus 103. That is, in the water treatment apparatus 300 of the embodiment, the preliminary reverse osmosis membrane treatment apparatus 305 and the reverse osmosis membrane treatment apparatus 303 may be the same apparatus (the same reverse osmosis membrane) or may be different apparatuses (different reverse osmosis membranes).

In addition, when the preliminary reverse osmosis membrane treatment apparatus 305 and the reverse osmosis membrane treatment apparatus 303 are different from each other, for example, since the TDS is increased toward the latter half of the water to be treated in a flow direction and the osmotic pressure also increases, the reverse osmosis membrane provided in the reverse osmosis membrane treatment apparatus 303 preferably has a higher pressure resistance.

[pH Adjuster, Microbubble Generating Apparatus, Crystallization Apparatus, Reverse Osmosis Membrane Treatment Apparatus]

The pH adjuster 304, the microbubble generating apparatus 301, the crystallization apparatus 302, and the reverse osmosis membrane treatment apparatus 303 are exemplified as the same apparatuses as the pH adjuster 204, the microbubble generating apparatus 201, the crystallization apparatus 202, and the reverse osmosis membrane treatment apparatus 203, respectively.

[Other Apparatuses]

Even in the water treatment apparatus 300 of the embodiment, the above-mentioned other apparatuses may be provided.

The water treatment apparatus 300 of the above-mentioned third embodiment includes the preliminary reverse osmosis membrane treatment apparatus 305, the pH adjuster 304, the microbubble generating apparatus 301, the crystallization apparatus 302, and the reverse osmosis membrane treatment apparatus 303.

Since the water treatment apparatus 300 of the third embodiment includes the preliminary reverse osmosis membrane treatment apparatus 305 in addition to each of the apparatuses of the water treatment apparatus 200 of the second embodiment, impurities other than water, such as ions, salts, or the like, contained in the water to be treated can be further removed, and the treated water (reverse osmosis membrane treated water) in which the content of the total dissolved solid (TDS) is further reduced can be produced. In addition, a recovery rate of the reverse osmosis membrane treated water can be further improved.

Water Treatment Apparatus of Fourth Embodiment

A water treatment apparatus 400 of a fourth embodiment includes a preliminary reverie osmosis membrane treatment apparatus 405 configured to separate water to be treated containing at least calcium ions into preliminary reverse osmosis membrane treated water and preliminary reverse osmosis membrane concentrated water using a preliminary reverse osmosis membrane, a pH adjuster 404 configured to adjust pH of the preliminary reverse osmosis membrane concentrated water to 9 or more, a microbubble generating apparatus 401 configured to generate microbubbles in the preliminary reverse osmosis membrane concentrated water, the pH of which is adjusted, and produce the preliminary reverse osmosis membrane concentrated water containing microbubbles, a crystallization apparatus 402 configured to crystallize calcium ions contained in the preliminary reverse osmosis membrane concentrated water containing the microbubbles as calcium carbonate and remove the calcium carbonate, a reverse osmosis membrane treatment apparatus 403 configured to separate the preliminary reverse osmosis membrane concentrated water, from which the calcium carbonate is removed, into reverse osmosis membrane treated water and reverse osmosis membrane concentrated water using a reverse osmosis membrane, an electrodialysis apparatus 406 configured to separate some of the preliminary reverse osmosis membrane concentrated water, from which the calcium carbonate is removed, into electrodialysis concentrated water and electrodialysis diluted water through electrodialysis treatment, an electrolysis apparatus 407 configured to electrolyze some of the electrodialysis concentrated water and produce an acidic aqueous solution and an alkaline aqueous solution, and a sodium hypochlorite producing apparatus 408 configured to electrolyze some of the electrodialysis concentrated water and produce a sodium hypochlorite aqueous solution.

Figure 10:
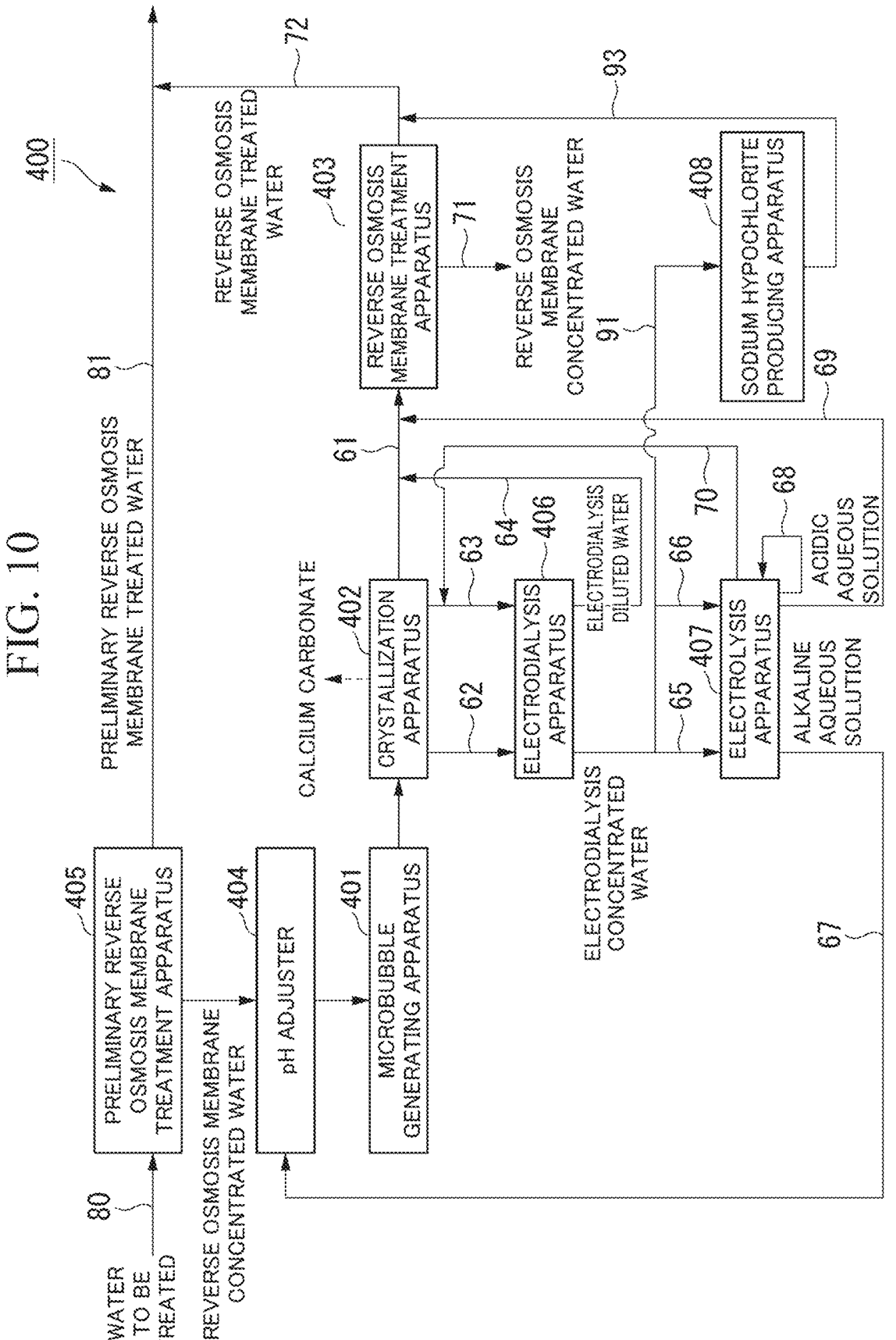
FIG. 10 is a schematic diagram of a water treatment apparatus 400 of the fourth embodiment.

A schematic diagram of the water treatment apparatus 400 of the first embodiment is as shown in FIG. 10.

The water treatment apparatus 400 of the fourth embodiment shown in FIG. 10 has the following configuration.

A water to be treated inflow pipe 80 configured to supply the water to be treated is connected to the preliminary reverse osmosis membrane treatment apparatus 405, and the preliminary reverse osmosis membrane treatment apparatus 405, the pH adjuster 404, the microbubble generating apparatus 401, the crystallization apparatus 402, and the reverse osmosis membrane treatment apparatus 403 are connected to each other by, for example, a pipeline.

A crystallization treated water discharge pipe 61, a crystallization treated water electrodialysis concentration chamber supply pipe 62, and a crystallization treated water electrodialysis diluting chamber supply pipe 63 are connected to an outlet side of the crystallization apparatus 402. The crystallization apparatus 402 is connected to the electrodialysis apparatus 406 via the crystallization treated water electrodialysis concentration chamber supply pipe 62 and the crystallization treated water electrodialysis diluting chamber supply pipe 63.

In addition, the crystallization apparatus 402 is connected to the reverse osmosis membrane treatment apparatus 403 via the crystallization treated water discharge pipe 61. An electrodialysis diluted water discharge pipe 64, an electrodialysis concentrated water cathode chamber supply pipe 65, and an electrodialysis concentrated water anode chamber supply pipe 66 are connected to an outlet side of the electrodialysis apparatus 406. The electrodialysis apparatus 406 is connected to the electrolysis apparatus 407 via the electrodialysis concentrated water cathode chamber supply pipe 65 and the electrodialysis concentrated water anode chamber supply pipe 66.

In addition, the electrodialysis apparatus 406 is connected to the reverse osmosis membrane treatment apparatus 403 via the electrodialysis diluted water discharge pipe 64 and the crystallization treated water discharge pipe 61. An alkaline water circulation pipe 67, a cleaning acidic water circulation pipe 68, a pH adjusting acidic water circulation pipe 69, and an electrodialysis acidic water circulation pipe 70 are connected to an outlet side of the electrolysis apparatus 407. The electrolysis apparatus 407 is connected to the pH adjuster 404 via the alkaline water circulation pipe 67. In addition, the electrolysis apparatus 407 is connected to the reverse osmosis membrane treatment apparatus 403 via the pH adjusting acidic water circulation pipe 69 and the crystallization treated water discharge pipe 61. Further, the electrolysis apparatus 407 is connected to the electrodialysis apparatus 406 via the electrodialysis acidic water circulation pipe 70 and the crystallization treated water electrodialysis diluting chamber supply pipe 63. A reverse osmosis membrane concentrated water discharge pipe 71 and a reverse osmosis membrane treated water discharge pipe 72 are connected to an outlet side of the reverse osmosis membrane treatment apparatus 403. The reverse osmosis membrane treated water discharge pipe 72 is connected to a preliminary reverse osmosis membrane treated water discharge pipe 81.

[Preliminary Reverse Osmosis Membrane Treatment Apparatus, pH Adjuster, Microbubble Generating Apparatus, Crystallization Apparatus, and Reverse Osmosis Membrane Treatment Apparatus]

The preliminary reverse osmosis membrane treatment apparatus 405, the pH adjuster 404, the microbubble generating apparatus 401, the crystallization apparatus 402, and the reverse osmosis membrane treatment apparatus 403 are the same apparatuses as the preliminary reverse osmosis membrane treatment apparatus 305, the pH adjuster 304, the microbubble generating apparatus 301, the crystallization apparatus 302, and the reverse osmosis membrane treatment apparatus 303, respectively.

[Electrodialysis Apparatus]

The electrodialysis apparatus 406 is an apparatus configured to separate some of the preliminary reverse osmosis membrane concentrated water, from which the calcium carbonate is removed, into electrodialysis concentrated water and electrodialysis diluted water through electrodialysis treatment.

Figure 11:
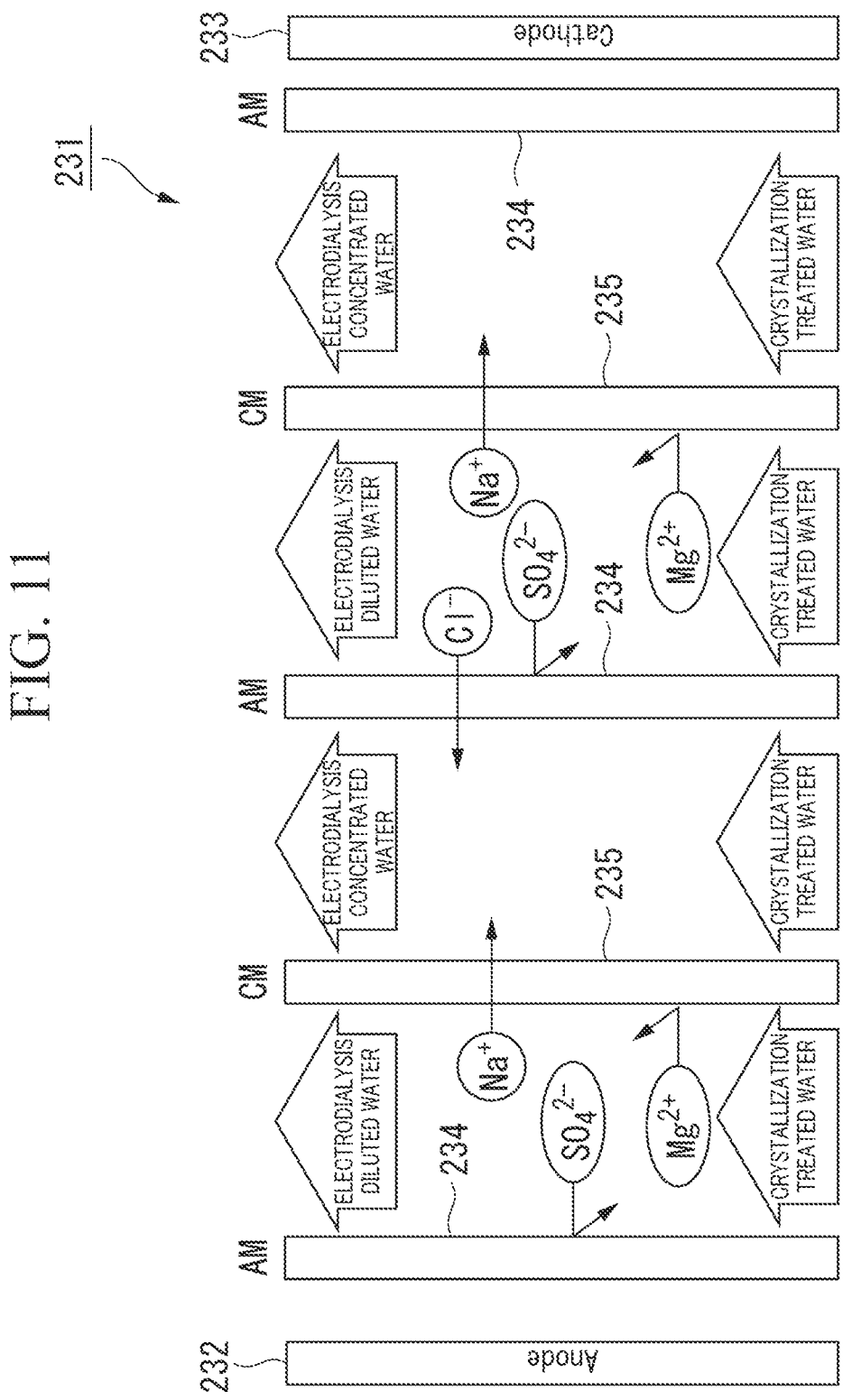
FIG. 11 is a schematic diagram of an electrodialysis apparatus 231 that is an example of the electrodialysis apparatus.

As an electrodialysis apparatus 230, specifically, an electrodialysis apparatus 231 having a univalent ion selective permeability ion exchange membrane shown in FIG. 11 is exemplified.

The electrodialysis apparatus 231 having the univalent ion selective permeability ion exchange membrane includes an anode 232 and a cathode 233. Further, by alternately providing a univalent anion selective permeability ion exchange membrane 234 and a univalent cation selective permeability ion exchange membrane 235 therebetween, they are divided into an electrodialysis diluting chamber 236 and an electrodialysis concentration chamber 237.

As the anode 232, for example, a known metal material such as gold, platinum or the like, or a known organic material such as a conductive carbon material, a conductive polymer, or the like, is exemplified. More specifically, examples include an electrode or the like in which a catalyst layer is formed by baking a catalyst on a conductive metal substrate that is stable against oxidation.

As the conductive metal, titanium or the like is exemplified.

As the catalyst, a precious metal such as platinum, iridium, ruthenium, rhodium, or the like; a valve metal such as titanium, tantalum, or the like; oxide of the valve metal, or the like, is exemplified.

A thickness of the conductive metal substrate is preferably 0.05 to 5 mm.

In addition, a thickness of the catalyst layer is 0.1 to 100 μm.

Porosity of the anode 232 is preferably 10 to 95%.

In order to increase adhesion of the catalyst, roughening treatment is preferably performed on the conductive metal. As the roughening treatment, blast treatment of spraying powder, etching using soluble acid, plasma spraying, or the like, is exemplified.

When the anode 232 is produced, before the catalyst layer is formed, an arc ion plating (AIP) ground layer formed of a valve metal-based alloy containing crystalline tantalum and titanium components is preferably formed on the conductive metal substrate through an AIP method. When the AIP ground layer is provided on the conductive metal substrate, interface corrosion of the metal substrate can be further prevented. In addition, instead of the AIP ground layer, a ground layer formed of a TiTaOx oxide layer may be formed.

As the anode 232, specifically, a Ti mesh electrode, a hydrogen gas diffusion electrode, or the like, on which a catalyst formed of Pt and Ir oxides is formed can be used.

Among them, from a viewpoint of further suppression of generation of chlorine, the hydrogen gas diffusion electrode is preferably used.

The hydrogen gas diffusion electrode is a gas electrode constituted by catalyst particles that causes hydrogen to be easily oxidized and carbon particles that are carriers of the catalyst particles.

As the catalyst particles, specifically, platinum, ruthenium, or the like, is exemplified.

As a specific aspect of the hydrogen gas diffusion electrode, an electrode including a support body and a power feeder is exemplified.

The support body of the hydrogen gas diffusion electrode includes a conductive carbon material (a sheet, a cross, a paper, or the like) with catalyst particles on which a hydrophobic resin is fixed.

As the power feeder, a porous plate such as a metal mesh or the like fabricated of a material with durability against acidity is exemplified. The support body and the power feeder are joined by crimping.

As a shape of the anode 232, for example, an arbitrary shape such as a tubular shape, a plate shape, a box shape, a spherical shape, or the like, can be applied.

As the cathode 233, for example, a known metal material such as gold, platinum, or the like, or a known organic material such as a conductive carbon material, a conductive polymer, or the like, is exemplified. More specifically, like the anode 232, an electrode or the like on which the catalyst layer is formed by baking the catalyst on the conductive metal substrate that is stable against oxidation is exemplified.

As the conductive metal, titanium, nickel, iron, stainless steel, carbon, or the like, is exemplified.

As the catalyst, a precious metal such as platinum, iridium, ruthenium, rhodium, or the like; a valve metal such as titanium, tantalum, or the like; oxide of the valve metal; or the like, is exemplified.

In addition, as the cathode 233, a platinum-plated conductive metal may also be used.

As a shape of the cathode 233, for example, an arbitrary shape such as a tubular shape, a plate shape, a box shape, a spherical shape, or the like, can be applied.

Materials and shapes of the anode 232 and the cathode 233 can be appropriately selected according to the water quality or the like of the water to be treated.

As the univalent anion selective permeability ion exchange membrane 234, while not particularly limited, a known univalent anion selective permeability ion exchange membrane can be used. For example, a univalent anion selective permeability ion exchange membrane or the like, in which a fourth grade ammonium group, a first grade amino group, a second grade amino group, a third grade amino group, and these ion exchange groups are further mixed in plural, is exemplified. Specifically, ACS (produced by ASTOM Corporation) or the like can be used.

As the univalent cation selective permeability ion exchange membrane 235, while not particularly limited, a known univalent cation selective permeability ion exchange membrane can be used. For example, a univalent cation selective permeability ion exchange membrane or the like having a sulfonate group, a carboxylic acid group, a phosphonic acid group, a sulphuric ester group, and a phosphoric acid ester group and in which the plurality types of these ion exchange groups are further mixed, is exemplified. Specifically, CIMS (produced by ASTOM Corporation) or the like can be used.

In the electrodialysis apparatus 230, while the preliminary reverse osmosis membrane concentrated water is supplied to the electrodialysis apparatus 230 (a concentration chamber of the electrodialysis apparatus), dialysis water with small multivalent ions (for example, tap water or the like) may be supplied to the electrodialysis apparatus 230 (a concentration chamber of the electrodialysis apparatus). That is, while not shown, the electrodialysis apparatus 230 may include a dialysis water electrodialysis concentration chamber supply pipe configured to supply dialysis water with small multivalent ions into the electrodialysis concentration chamber.

The acidic aqueous solution produced by the electrolysis apparatus 407, which will be described below, is added to the preliminary reverse osmosis membrane concentrated water (the preliminary reverse osmosis membrane concentrated water, from which the above-mentioned calcium carbonate is removed) supplied to the electrodialysis apparatus 406 through the electrodialysis acidic water circulation pipe 70. Accordingly, deterioration of the univalent anion selective permeability ion exchange membrane and the univalent cation selective permeability ion exchange membrane provided in the electrodialysis apparatus 406 can be further prevented.

When the water treatment apparatus 400 includes the electrodialysis apparatus 406, since the concentration of the univalent cations (alkali metal ions) in the preliminary reverse osmosis membrane concentrated water (the water to be treated, from which the calcium carbonate is increased), from which the calcium carbonate is removed, can be increased, in the electrolysis apparatus 407, which will be described below, the alkaline aqueous solution can be produced more efficiently. In addition, the multivalent ions that can be easily adhered to the electrolysis apparatus 407 can be removed in advance.

[Electrolysis Apparatus]

The electrolysis apparatus 407 is an apparatus configured to electrolyze some of the electrodialysis concentrated water and produce an acidic aqueous solution and an alkaline aqueous solution.

Figure 12:
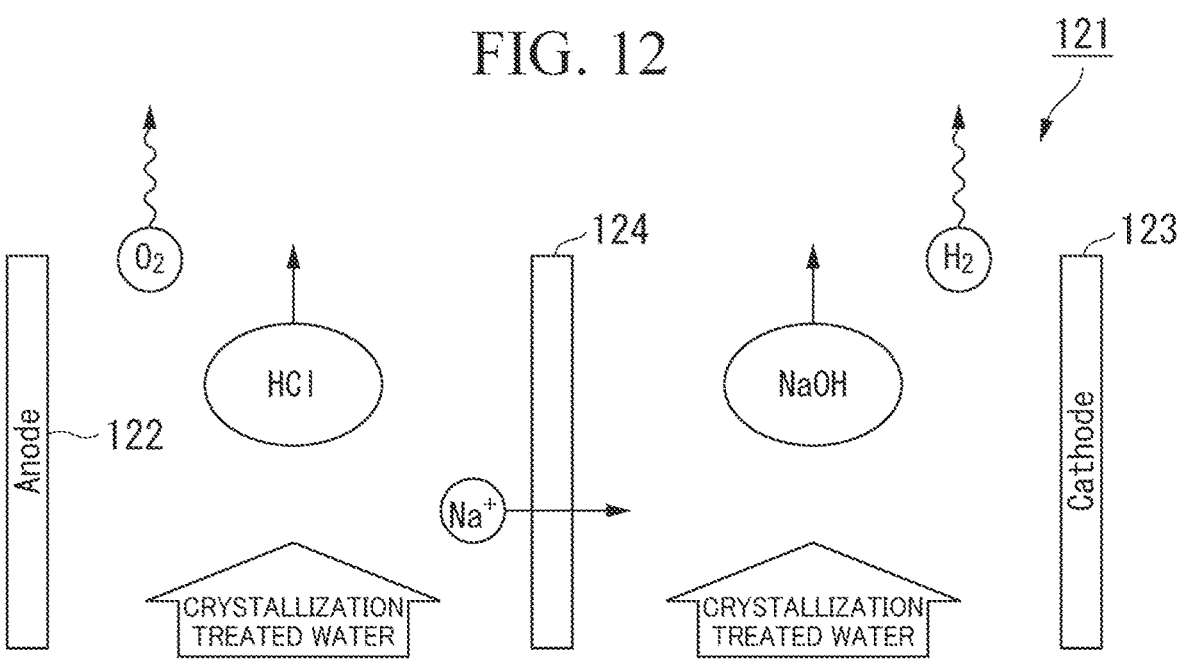
FIG. 12 is a schematic diagram of a two-chamber electrolysis apparatus 121 that is an example of the electrolysis apparatus.
Figure 13:
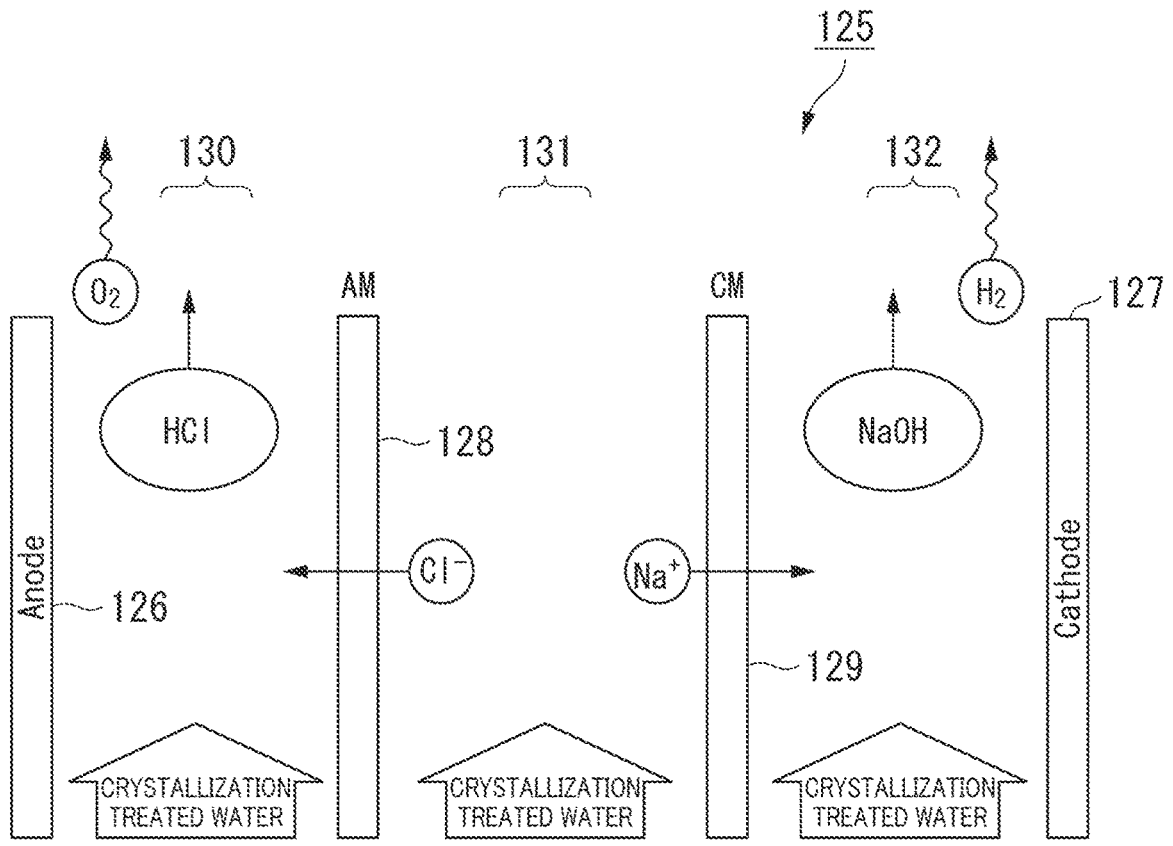
FIG. 13 is a schematic diagram of a three-chamber electrolysis apparatus 125 that is an example of the electrolysis apparatus.

As the electrolysis apparatus 407, specifically, a two-chamber electrolysis apparatus 121 shown in FIG. 12, a three-chamber electrolysis apparatus 125 shown in FIG. 13, or the like, is exemplified.

The two-chamber electrolysis apparatus 121 shown in FIG. 12 has an anode 122 and a cathode 123, and is divided into an anode chamber and a cathode chamber by a barrier membrane 124.

As the anode 122, for example, a known metal material such as gold, platinum, or the like, or a known organic material such as a conductive carbon material, a conductive polymer, or the like, is exemplified. More specifically, the same as the above-mentioned anode 232 is exemplified.

As a shape of the anode 122, for example, an arbitrary shape such as a tubular shape, a plate shape, a box shape, a spherical shape, or the like, can be applied.

As the cathode 123, for example, a known metal material such as gold, platinum, or the like, or a known organic material such as a conductive carbon material, a conductive polymer, or the like, is exemplified. More specifically, the same as the above-mentioned cathode 233 is also exemplified.

As a shape of the cathode 123, for example, an arbitrary shape such as a tubular shape, a plate shape, a box shape, a spherical shape, or the like, can be applied.

Materials and shapes of the anode 122 and the cathode 123 can be appropriately selected according to the water quality or the like of the water to be treated.

As the barrier membrane 124, specifically, an ion exchange membrane, a resin film with porosity, a ceramic film with porosity, or the like, are exemplified. Among these, a member including a neutral membrane such as a resin film with porosity and a ceramic film with porosity is preferably provided. As an example of a commercial product such as a resin film with porosity, Y9201 or the like produced by YUASA Membrane System Company is exemplified.

Mixed water of hydrochloric acid and salt water is produced in the anode chamber, and mixed water of sodium hydroxide and salt water is produced in the cathode chamber by electrolysis from the electrodialysis concentrated water.

The three-chamber electrolysis apparatus 125 shown in FIG. 13 has an anode 126 and a cathode 127, and is divided into an anode chamber 130, an intermediate chamber 131, a cathode chamber 132 by an anion exchange membrane 128 on the side of the anode 126 and a cation exchange membrane 129 on the side of the cathode 127.

In the three-chamber electrolysis apparatus 125, the electrolysis is performed by only the intermediate chamber 131, the ions generated in the intermediate chamber 131 are moved to both the anode chamber 130 and the cathode chamber 132.

Hydrochloric acid is produced in the anode chamber 130 and sodium hydroxide is produced in the cathode chamber 132 by electrolysis from the electrodialysis concentrated water. In the case of the three-chamber electrolysis apparatus 125, unlike the two-chamber electrolysis apparatus 121, it has a merit that salt water does not mix with hydrochloric acid and sodium hydroxide.

An alkaline aqueous solution (for example, sodium hydroxide) produced by the electrolysis apparatus 407 is supplied to the pH adjuster via the alkaline water circulation pipe 67.

An acidic aqueous solution (for example, hydrochloric acid) produced by the electrolysis apparatus 407 is used when the inside of the electrolysis apparatus 407 is cleaned upon stoppage of the electrolysis apparatus 407 via the cleaning acidic water circulation pipe 68. Further, the electrolysis apparatus 407 may include a storage tank configured to store the acidic aqueous solution.

In addition, the acidic aqueous solution (for example, hydrochloric acid) produced by the electrolysis apparatus 407 is also supplied to the water to be treated supplied to the reverse osmosis membrane treatment apparatus 403 via the pH adjusting acidic water circulation pipe 69. Accordingly, precipitation of the ion components contained in the water to be treated such as preliminary reverse osmosis membrane concentrated water or the like can be prevented.

[Sodium Hypochlorite Producing Apparatus]

The sodium hypochlorite producing apparatus 408 is an apparatus configured to electrolyze some of the electrodialysis concentrated water and produce a sodium hypochlorite aqueous solution.

Figure 14:
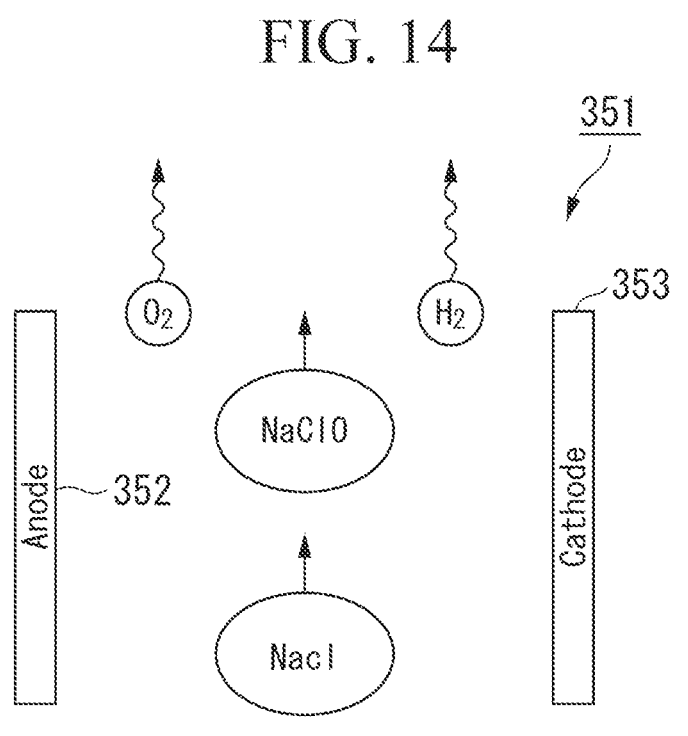

As the sodium hypochlorite producing apparatus 408, specifically, a single chamber electrolysis apparatus 351 shown in FIG. 14 is exemplified. The single chamber electrolysis apparatus 351 includes an anode 352 and a cathode 353.

As the anode 352, for example, a known metal material such as gold, platinum, or the like, or a known organic material such as a conductive carbon material, a conductive polymer, or the like, is exemplified.

As a shape of the anode 352, for example, an arbitrary shape such as a tubular shape, a plate shape, a box shape, a spherical shape, or the like, can be applied.

As the cathode 353, for example, a known metal material such as gold, platinum, or the like, or a known organic material such as a conductive carbon material, a conductive polymer, or the like, is exemplified.

As a shape of the cathode 353, for example, an arbitrary shape such as a tubular shape, a plate shape, a box shape, a spherical shape, or the like, can be applied.

Materials and shapes of the anode 352 and the cathode 353 can be appropriately selected according to the water quality or the like of the water to be treated.

The water treatment apparatus 400 of the above-mentioned fourth embodiment includes the preliminary reverse osmosis membrane treatment apparatus 405, the pH adjuster 404, the microbubble generating apparatus 401, the crystallization apparatus 402, the reverse osmosis membrane treatment apparatus 403, the electrodialysis apparatus 406, the electrolysis apparatus 407, and the sodium hypochlorite producing apparatus 408.

Since the water treatment apparatus 400 of the fourth embodiment includes the electrodialysis apparatus 406, the electrolysis apparatus 407, and the sodium hypochlorite producing apparatus 408 and the liquid chemical required for the apparatus can be produced and used on-site, it is not necessary to transport the chemical to the outside and store the chemical, and an economic burden can be further reduced.

In the specification, words indicating directions such as forward, rearward, upward, downward, rightward, leftward, vertical, horizontal, longitudinal, lateral, row, column, and the like, refer to these directions in the apparatus of the present invention. Accordingly, these words in the specification of the present invention should be interpreted relatively in the apparatus of the present invention.

The word "configured" is used to execute a function of the present invention or express a composition, an element, or a portion of the apparatus.

Further, words expressed as "means plus function" in the claims should include any structure that can be utilized to perform functions included in the present invention.

A word expressed as "unit" is used to express a portion of software programmed to execute a component, a unit, hardware, or a desired function. While a typical example of the hardware is a device or a circuit, there is no limitation thereto.

Hereinabove, the preferred examples of the present invention have been described, the present invention is not limited to these examples. Additions, omissions, substitutions, and other changes of components may be made without departing from the spirit of the present invention. The present invention is not limited to the above-mentioned description, and is limited by only the scope of the appended claims.

REFERENCE SIGNS LIST

S101, S201, S301, S401 Microbubble generating step
S102, S202, S302, S402 Water softening step S103, S203. S303, S403 Reverse osmosis membrane treatment step
S204, S304, S404 pH adjusting step
S305, S405 Preliminary reverse osmosis membrane treatment step
S406 Electrodialysis step
S407 Electrolysis step
S408 Sodium hypochlorite producing step
100, 200, 300, 400 Water treatment apparatus
101, 201, 301, 401 Microbubble generating apparatus
102, 202, 302, 402 Crystallization apparatus
103, 203, 303, 403 Reverse osmosis membrane treatment apparatus
204, 304, 404 pH adjuster
305, 405 Preliminary reverse osmosis membrane treatment apparatus
406 Electrodialysis apparatus
407 Electrolysis apparatus
408 Sodium hypochlorite producing apparatus
The invention claimed is:

1. A water treatment method comprising:
a microbubble generating step of generating microbubbles in water to be treated containing calcium ions and producing water to be treated containing microbubbles;
a water softening step of crystallizing the calcium ions contained in the water to be treated containing the microbubbles as calcium carbonate and removing the calcium carbonate;
a reverse osmosis membrane treatment step of separating the water to be treated, from which the calcium carbonate has been removed, into reverse osmosis membrane treated water and reverse osmosis membrane concentrated water using a reverse osmosis membrane;
a preliminary reverse osmosis membrane treatment step of separating the water to be treated containing the calcium ions using a reverse osmosis membrane into preliminary reverse osmosis membrane treated water and into preliminary reverse osmosis membrane concentrated water that is directed to the microbubble generating step;
an electrodialysis step of separating some of the water to be treated, from which the calcium carbonate has been removed in the water softening step, into electrodialysis concentrated water and electrodialysis diluted water through electrodialysis treatment; and
an electrolysis step of electrolyzing some of the electrodialysis concentrated water and obtaining an acidic aqueous solution and an alkaline aqueous solution.

2. The water treatment method according to claim 1, further comprising:
a pH adjusting step of adjusting a pH of the water to be treated containing the calcium ions to 8.3 or more and less than 10 before the water softening step.

3. The water treatment method according to claim 1, wherein, in the water softening step, a hydraulic retention time of the microbubbles is 5 to 30 seconds.

4. The water treatment method according to claim 1, wherein the alkaline aqueous solution obtained in the electrolysis step is mixed with water to be treated containing the microbubbles which has been softened in the water softening step and has not been electrolyzed in the electrolysis step.

5. The water treatment method according to claim 1, wherein the acidic aqueous solution obtained in the electrolysis step is used to clean an inside of an electrolysis apparatus used in the electrolysis step.

6. The water treatment method according to claim 1, wherein the acidic aqueous solution obtained in the electrolysis step is used to neutralize the preliminary reverse osmosis membrane concentrated water, which has been adjusted to be alkaline in the water softening step.

7. The water treatment method according to claim 1, further comprising:
a sodium hypochlorite producing step of electrolyzing some of the electrodialysis concentrated water and producing a sodium hypochlorite aqueous solution.

8. A water treatment apparatus comprising:
a microbubble generating apparatus configured to generate microbubbles in water to be treated containing calcium ions and produce water to be treated containing microbubbles;
a crystallization apparatus configured to crystallize the calcium ions contained in the water to be treated containing the microbubbles as calcium carbonate and remove the calcium carbonate;
a reverse osmosis membrane treatment apparatus configured to separate the water to be treated, from which the calcium carbonate has been removed, into reverse osmosis membrane treated water and reverse osmosis membrane concentrated water using a reverse osmosis membrane;
a preliminary reverse osmosis membrane treatment apparatus using a reverse osmosis membrane configured to separate the water to be treated containing the calcium ions into preliminary reverse osmosis membrane treated water and into preliminary reverse osmosis membrane concentrated water directed to the microbubble generating apparatus;
an electrodialysis apparatus configured to separate some of the water to be treated, from which the calcium carbonate has been removed by the crystallization apparatus, into electrodialysis concentrated water and electrodialysis diluted water through electrodialysis treatment; and
an electrolysis apparatus configured to electrolyze some of the electrodialysis concentrated water and obtain an acidic aqueous solution and an alkaline aqueous solution.

9. The water treatment apparatus according to claim 8, further comprising:
a pH adjuster configured to adjust a pH of the water to be treated containing the calcium ions supplied to the microbubble generating apparatus to 9 or more.

10. The water treatment apparatus according to claim 8, wherein, in the crystallization apparatus, a hydraulic retention time of the microbubbles is 5 to 30 seconds.

11. The water treatment apparatus according to claim 8, further comprising:
a pipe that supplies the alkaline aqueous solution obtained by the electrolysis apparatus to upstream of the crystallization apparatus so that the alkaline aqueous solution is mixed with the water to be treated containing the microbubbles.

12. The water treatment apparatus according to claim 8, further comprising:
a pipe that supplies the acidic aqueous solution obtained by the electrolysis apparatus to the electrolysis apparatus to clean an inside of the electrolysis apparatus.

13. The water treatment apparatus according to claim 8, further comprising:
a pipe that supplies the acidic aqueous solution obtained by the electrolysis apparatus to the crystallization apparatus to neutralize preliminary reverse osmosis membrane concentrated water, which has been adjusted to be alkaline in the crystallization apparatus and has not been electrolyzed in the electrolysis apparatus.

14. The water treatment apparatus according to claim 8, further comprising:

a sodium hypochlorite producing apparatus configured to electrolyze some of the electrodialysis concentrated water and produce a sodium hypochlorite aqueous solution.

* * * * *